(12) United States Patent
Aubin-Marchand et al.

(10) Patent No.: US 11,794,828 B2
(45) Date of Patent: Oct. 24, 2023

(54) PIVOT ASSEMBLY FOR A GROUND-CONTACTING WHEEL ASSEMBLY

(71) Applicant: SOUCY INTERNATIONAL INC., Drummondville (CA)

(72) Inventors: Jeremie Aubin-Marchand, St-Hugues (CA); Yan Roger, Drummondville (CA); Stephane Pelletier, Drummondville (CA); Benoit Savage, Saint-Bonaventure (CA); Samuel Lasnier Guillemette, Richmond (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 750 days.

(21) Appl. No.: 16/916,687

(22) Filed: Jun. 30, 2020

(65) Prior Publication Data

US 2021/0403105 A1  Dec. 30, 2021

(51) Int. Cl.
*B62D 55/108* (2006.01)
*B62D 55/32* (2006.01)
*B62D 55/15* (2006.01)
*B62D 55/10* (2006.01)

(52) U.S. Cl.
CPC ......... *B62D 55/1086* (2013.01); *B62D 55/10* (2013.01); *B62D 55/15* (2013.01); *B62D 55/32* (2013.01)

(58) Field of Classification Search
CPC ......... B62D 55/10; B62D 55/15; B62D 55/32
See application file for complete search history.

(56) References Cited

U.S. PATENT DOCUMENTS

| 3,018,143 | A | * | 1/1962 | Masser | F16C 33/20 384/155 |
| 3,081,292 | A | * | 3/1963 | Bennett | B60G 11/22 280/681 |
| 3,889,769 | A | | 6/1975 | Blomstrom et al. | |
| 3,974,891 | A | * | 8/1976 | Persson | B62D 55/0842 305/120 |
| 4,385,673 | A | | 5/1983 | Olt, Jr. | |

(Continued)

FOREIGN PATENT DOCUMENTS

| EP | 0597614 A1 | 5/1994 |
| GB | 2105269 B | 8/1984 |

(Continued)

*Primary Examiner* — Jacob D Knutson
(74) *Attorney, Agent, or Firm* — BCF LLP

(57) ABSTRACT

A pivot assembly for connecting a ground-contacting wheel assembly to a frame member of a track system assembly has a base defining a first interlocking member, a resilient body structured for being received at least partially within the base and having a second interlocking member connectable to the first interlocking member, and an axle assembly configured for rotatably connecting the ground-contacting wheel assembly to the frame member, the axle assembly including a third interlocking member connectable to the second interlocking member. The resilient body is at least partially wrappable around the peripheral surface of the axle assembly. Upon deformation of the resilient body, the axle assembly is pivotally movable relative to the frame member of the track system assembly about at least one of a longitudinal axis and a vertical axis.

20 Claims, 34 Drawing Sheets

(56) References Cited

U.S. PATENT DOCUMENTS

| | | | |
|---|---|---|---|
| 4,690,231 | A | 9/1987 | Riml |
| 4,702,346 | A | 10/1987 | Uno et al. |
| 5,190,269 | A | 3/1993 | Ikeda et al. |
| 5,887,859 | A | 3/1999 | Hadano et al. |
| 6,739,679 | B2 | 5/2004 | Ueno et al. |
| 6,899,323 | B2 | 5/2005 | Takeshita et al. |
| 7,789,407 | B2 | 9/2010 | Lefferts et al. |
| 8,037,573 | B2 | 10/2011 | Bost, Jr. |
| 8,192,106 | B2 | 6/2012 | Vogler |
| 8,282,305 | B2 | 10/2012 | Rechtien |
| 8,505,889 | B2 | 8/2013 | Suzuki |
| 8,616,773 | B2 | 12/2013 | Thornhill |
| 9,475,358 | B2 | 10/2016 | Grim |
| 9,562,583 | B2 | 2/2017 | Kondor |
| 9,719,570 | B2 | 8/2017 | Kojima |
| 9,732,816 | B2 | 8/2017 | Conrad et al. |
| 10,266,215 | B2 | 4/2019 | Jean et al. |
| 10,316,920 | B2 | 6/2019 | Shinobu et al. |
| 2005/0145397 | A1 | 7/2005 | Michael et al. |
| 2011/0116731 | A1 | 5/2011 | Mclaughlin |
| 2012/0315079 | A1 | 12/2012 | Nuechterlein |
| 2013/0043719 | A1 | 2/2013 | Wietharn et al. |
| 2017/0051804 | A1 | 2/2017 | Zimmerman et al. |
| 2017/0274946 | A1* | 9/2017 | Vik .................. B62D 55/15 |
| 2018/0135722 | A1 | 5/2018 | Oniwa |

FOREIGN PATENT DOCUMENTS

| | | |
|---|---|---|
| WO | 1989/004773 A1 | 6/1989 |
| WO | 2006/018684 A1 | 2/2006 |
| WO | 2007/042934 A1 | 4/2007 |
| WO | 2018/079244 A1 | 5/2018 |

\* cited by examiner

PIVOT ASSEMBLY FOR A GROUND-CONTACTING WHEEL ASSEMBLY

TECHNICAL FIELD

The technology relates to a pivot assembly for a ground-contacting wheel assembly for tracked vehicles.

BACKGROUND

When a tracked vehicle travels over an uneven ground having an irregular surface (bumps, pits, obstacles, debris, etc.), a lot of vibration and shocks are typically transmitted to the components of the track system assembly, and under some circumstances, to the chassis of the tracked vehicle itself. This situation causes premature deterioration of the components of track system assembly and/or of components of the vehicle.

Many inventions have been created to reduce such issue, but without fully satisfying all needs of tracked vehicles users.

For instance, U.S. Patent Publication No. 2017/0274946A1, entitled "Suspension System for a Track-driven Work Vehicle with Resilient Roller Wheel Bushings", incorporated herein by reference, discloses a suspension system including a tube-like resilient bushing for coupling the roller wheels to a support beam of the track system, the resilient bushing been configured to receive a free end of a roller shaft.

U.S. Pat. No. 5,190,269, entitled "Rubber Bushing", incorporated herein by reference, discloses a rubber bushing for automotive applications having an outer cylindrical member, an inner cylindrical member including a non-circular-shaped ring made of hard resin molded at a central portion, and a rubber elastic member molded by vulcanization.

U.S. Pat. No. 6,739,679, entitled "Rolling Wheel Support Structure For A Crawler Traveling Apparatus", incorporated herein by reference, discloses a structure to be installed between the track frame and the rotary shaft of rolling wheel assembly in order to permit vertical movement of the rolling wheel assembly, the structure comprising a block-shaped buffer member formed from an elastic material.

There is therefore a desire for resilient assemblies that could improve known suspension systems for track systems.

SUMMARY OF THE TECHNOLOGY

In general, the present technology is directed at improving pivotal movement of a ground-contacting wheel assembly of a tracked vehicle.

More specifically, the present technology is a pivot assembly that is easy to install and easy to remove in order to replace a ground-contacting wheel assembly during maintenance activities. Due to its configuration, replacement of components of the pivot assembly is also easy to perform. It is believed that the technologies described known in the art does not provide such "maintenance-friendly" aspect, while being as cost effective as least some embodiments the present technology.

In accordance with one aspect of the present technology, there is provided a pivot assembly for connecting a ground-contacting wheel assembly to a frame member of a track system assembly. The pivot assembly includes a base connected to the frame member of the track system. The base defines a first interlocking member. The pivot assembly further includes a resilient body structured for being received at least partially within the base. The resilient body includes a second interlocking member connectable to the first interlocking member. Connection of the first and the second interlocking members limits relative movement between the base and the resilient body along and about a transverse axis. The pivot assembly further includes an axle assembly configured for rotatably connecting the ground-contacting wheel assembly to the frame member of the track system. The axle assembly has a peripheral surface being at least partially wrappable around by the resilient body. The axle assembly includes a third interlocking member connectable to the second interlocking member of the resilient body. Connection of the second and the third interlocking members limits relative movement between the resilient body and the axle assembly along and about the transverse axis. Upon deformation of the resilient body, the axle assembly is pivotally movable relative to the frame member of the track system assembly about at least one of a longitudinal axis and a vertical axis.

In some embodiments, the base is integrally formed with the frame member of the track system.

In some embodiments, the frame member of the track system has a cut-out defined therein sized and dimensioned for receiving the base.

In some embodiments, the base defines a wrap around angle over the resilient body being greater than about 180 and smaller than about 360 degrees.

In some embodiments, the base is elastically deformed to hold the resilient body within the base.

In some embodiments, when the third interlocking member is connected to the second interlocking member, a vertical spacing is defined between the first and the second interlocking members.

In some embodiments, the first, second and third interlocking members have a generally hemispherical shape, the second interlocking member is received within the first interlocking member, and the third interlocking member is received within the second interlocking member.

In some embodiments, the pivot assembly defines a virtual pivot point, and the longitudinal axis extends below the virtual pivot point.

In some embodiments, the ground-contacting wheel assembly is a tandem assembly, and the axle assembly supports a plurality of roller wheel assemblies.

In some embodiments, the resilient body wraps around the peripheral surface of the axle assembly in a wrap angle being greater than about 180 and smaller than about 360 degrees.

In some embodiments, when received at least partially within the base, the resilient body is open in a lower portion thereof.

In some embodiments, the pivot assembly further includes at least one clamping member connected to the base, the at least one clamping member defining a clamp recess configured to receive a bulged portion of the resilient body.

In some embodiments, the at least one clamping member includes a first clamping member connected to the base and being located forward of the transverse axis, and a second clamping member connected to the base and being located rearward of the transverse axis.

In some embodiments, the resilient body comprises at least one flange projecting radially away from the transverse axis, the at least one flange overlapping at least partially the base.

In some embodiments, the base has an upper portion flaring outwardly from a longitudinal centre plane, and the resilient body has outer portions flaring outwardly from the longitudinal centre plane.

In some embodiments, the resilient body has protrusions extending radially inwardly for sealing an interface between the resilient body and the axle assembly.

In some embodiments, the resilient body has cavities defined therein for allowing local expansion of a material forming the resilient body when deformed.

A track system including the pivot assembly described above is also provided.

There is also provided a method for replacing a first ground-contacting wheel assembly connected to a frame of a track system assembly via the pivot assembly described above with a second ground-contacting wheel assembly, the method comprising the steps of removing the first ground-contacting wheel assembly from the pivot assembly, withdrawing the resilient body from the axle assembly of the first ground-contacting wheel assembly, installing the resilient body on an axle assembly of the second ground contacting wheel assembly by connecting the second and third interlocking members, and connecting the second ground-contacting wheel assembly to the pivot assembly.

In some embodiments, the method further includes the steps of removing a resilient track from the track system assembly before removing the first ground-contacting wheel assembly from the pivot assembly, and reinstalling the resilient track on the track system assembly after connecting the second ground-contacting wheel assembly to the pivot assembly.

There is also provided a method for installing a ground-contacting wheel assembly on a frame member of a track system assembly via the pivot assembly as described above, the method includes the steps of wrapping around the resilient body over the axle assembly for connecting the second and third interlocking members, and inserting the resilient body wrapped around the axle assembly into the base for connecting the first and second interlocking members.

In some embodiments, the method further includes the steps of removing a resilient track from the track system assembly before installing the ground-contacting wheel assembly on the frame member via the pivot assembly, and reinstalling the resilient track on the track system assembly after installing the ground-contacting wheel assembly on the frame member via the pivot assembly.

In accordance with another aspect of the present technology, there is provided a pivot assembly for a ground-contacting wheel assembly including at least one wheel and an axle assembly, the at least one wheel being rotatably connected to the axle assembly, the axle assembly having a peripheral surface, and the pivot assembly including a resilient body configured to receive the axle assembly, and a base configured to receive the resilient body. The resilient body has an open cross-section and is configured to wrap around at least a portion of the peripheral surface of the axle assembly, and the resilient body has an interlocking member configured to position the resilient body with respect to at least one mating part having a complementary interlocking member.

In some embodiments, the axle assembly is connected to a tandem assembly and the at least one wheel is a plurality of wheels configured in a tandem assembly.

In some embodiments, the at least one mating part is at least one of the shaft, the axle assembly, and the first part.

In some embodiments, the resilient body wraps the peripheral surface of the shaft in a wrap angle greater than about 180 degrees.

In some embodiments, the first part wraps the resilient body in a wrap angle greater than about 180 degrees and maintains the resilient body between the first part and the shaft.

In some embodiments, the interlocking member of the resilient body is partially complementary with the complementary feature of the at least one mating part.

In some embodiments, a clamping member maintains the resilient body between the base and the axle assembly.

In some embodiments, the resilient body is made of an elastomer such as rubber.

In accordance with another aspect of the present technology, there is provided a resilient body for a pivot assembly for a ground-contacting wheel assembly for a track system, the pivot assembly including a base structured to receiving the resilient body, the ground-contacting wheel assembly including at least one wheel and an axle assembly, the at least one wheel being rotatably connected to the axle assembly, the axle assembly having a peripheral surface, the resilient body having a body made of resilient material and having an open cross-section. The body defines an internal shape configured to receive the axle assembly and to wrap around at least a portion of the peripheral surface of the axle assembly. The body further defines an external shape configured to be received in the base. The body further includes an interlocking member configured to position the resilient body with respect to the base. The resilient body is configured to permit pivotal movement of the axle assembly relative to the pivot assembly in predetermined rotational and translational ranges of motion.

In some embodiments, the interlocking member of the resilient body is partially complementary with a complementary feature of the base.

In some embodiments, the open cross-section of the resilient body is configured to have a wrap angle over the peripheral surface of the axle assembly being comprised between about 180 and about 360 degrees.

In some embodiments, the resilient body is configured to permit a predetermined rotational range of motion of the axle assembly relative to the pivot assembly that is greater about a longitudinal axis than about a vertical axis.

In some embodiments, the resilient body is configured to limit longitudinal, transversal and vertical translational ranges of motion of the shaft relative to the pivot assembly.

In some embodiments, the resilient body has protrusions projecting radially inwardly to seal an interface with the peripheral surface of the axle assembly.

In some embodiments, the resilient body includes flanges and bulged portions.

There is also provided a track system for a vehicle including a frame operatively connected to the vehicle, a resilient track, a driving wheel for driving the track, a leading idler wheel assembly and a trailing idler wheel assembly, a plurality of roller wheel assemblies, and the pivot assembly described above, and at least one of the leading idler wheel assembly, the trailing idler wheel assembly, and at least one of the plurality of roller wheel assemblies is mounted to the frame using the pivot assembly.

In some embodiments, some of the plurality of roller wheels assemblies are configured in a tandem assembly pivoting about a transversal axis.

There is also provided a vehicle equipped with the track system assembly described above.

There is also provided a method for replacing a ground-contacting wheel assembly connected to a frame of a track system assembly via a pivot assembly, the track system assembly being the track system assembly described above, the ground-contacting wheel including a shaft and at least one wheel rotatably connected to the shaft, the pivot assembly being the pivot assembly described above including the resilient body described above, the method including the following steps: lower tension in the resilient track, remove resilient track from the track system assembly, remove the ground-contacting wheel assembly from the pivot assembly (the ground-contacting wheel assembly is released as an assembly), remove the resilient body from the shaft, install the resilient body on the shaft of a new ground-contacting wheel assembly, insert the resilient body and the new ground-contacting wheel assembly inside the first part, reinstall the resilient track on the track system assembly, and reapply predetermined tension to the resilient track.

There is also provided a method for replacing a resilient body of a pivot assembly used to mount a ground-contacting wheel assembly to the frame of a track system assembly, the track system assembly being the track system assembly described above, the ground-contacting wheel including a shaft and at least one wheel rotatably connected to the shaft, the pivot assembly being the pivot assembly described above including the resilient body described above, the method including the following steps: lower tension in the resilient track, remove the resilient track from the track system assembly, remove the ground-contacting wheel assembly from the pivot assembly, remove the worn resilient body, install a new resilient body on the axle assembly of the ground-contacting wheel assembly; insert the new resilient body and the new ground-contacting wheel assembly inside the first part, reinstall the resilient track on the track system assembly, and reapply predetermined tension to the resilient track.

In some embodiments, the resilient body is located on the shaft of the ground-contacting wheel assembly by matching respective interlocking members of the resilient body and the shaft.

In some embodiments, the resilient body is located inside the first part by matching respective interlocking members of the resilient body and the first part.

In accordance with yet another aspect of the present technology, there is provided a pivot assembly for pivotably connecting at least one wheel of a track system to a frame of the track system, the pivot assembly comprising an axle assembly extending transverse to the frame in a transversal direction of the track system, the axle assembly including an axle for supporting at least indirectly the at least one wheel, the axle assembly further including a first interlocking member. The pivot assembly further includes a resilient body at least partially wrapped around the axle assembly, the resilient body having a second interlocking member sized and dimensioned for connecting to the first interlocking member, and a base connected to the frame of the track system. The base is structured for connecting the axle assembly and the resilient body to the frame, the base defining a third interlocking member sized and dimensioned for connecting to the second interlocking member. The axle assembly, the first interlocking member, the second interlocking member, and the third interlocking member defining a virtual pivot point being vertically offset from the axle, and the axle being pivotable about the virtual pivot axis upon deformation of the resilient body.

In some embodiments, at least a portion of the third interlocking member is vertically spaced from the second interlocking member.

In some embodiments, the pivot assembly further includes at least one clamping member structured for clamping the resilient bushing to the base.

In some embodiments, the at least one clamping member includes first and second clamping members.

In some embodiments, the at least one clamping member is a front clamping member and a rear clamping member, the front clamping member being structured for receiving a front bulged portion of the resilient body, and the rear clamping member being structured for receiving a rear bulged portion of the resilient body.

In some embodiments, a longitudinal centre plane intersects the third interlocking member, and the virtual pivot axis is contained in the longitudinal centre plane In some embodiments, at least one of the first, second and third interlocking member has a generally hemispherical shape.

In some embodiments, the resilient body is structured to permit roll motion of the axle assembly relative to the frame.

In some embodiments, the base wraps around the resilient body over a wrap angle that is greater than about 180 degrees and smaller than about 360 degrees.

In some embodiments, the base has front and rear flanges adapted for connection to the frame.

In some embodiments, the axle assembly is pivotable about the virtual pivot point in a range comprised between about −5 degrees and about +5 degrees.

In some embodiments, the resilient body is under compression throughout the range of pivoting of the axle assembly.

BRIEF DESCRIPTION OF THE DRAWINGS

The drawings included herewith are for illustrating various embodiments of articles, products, methods, and apparatuses described in the present specification. The drawings could not be to scale. Some features shown in the drawings could be exaggerated, or scaled down, relative to their possible "life" size(s), in order to make these features clearly visible in the drawings. In the drawings.

DETAILED DESCRIPTION

Figure 1:
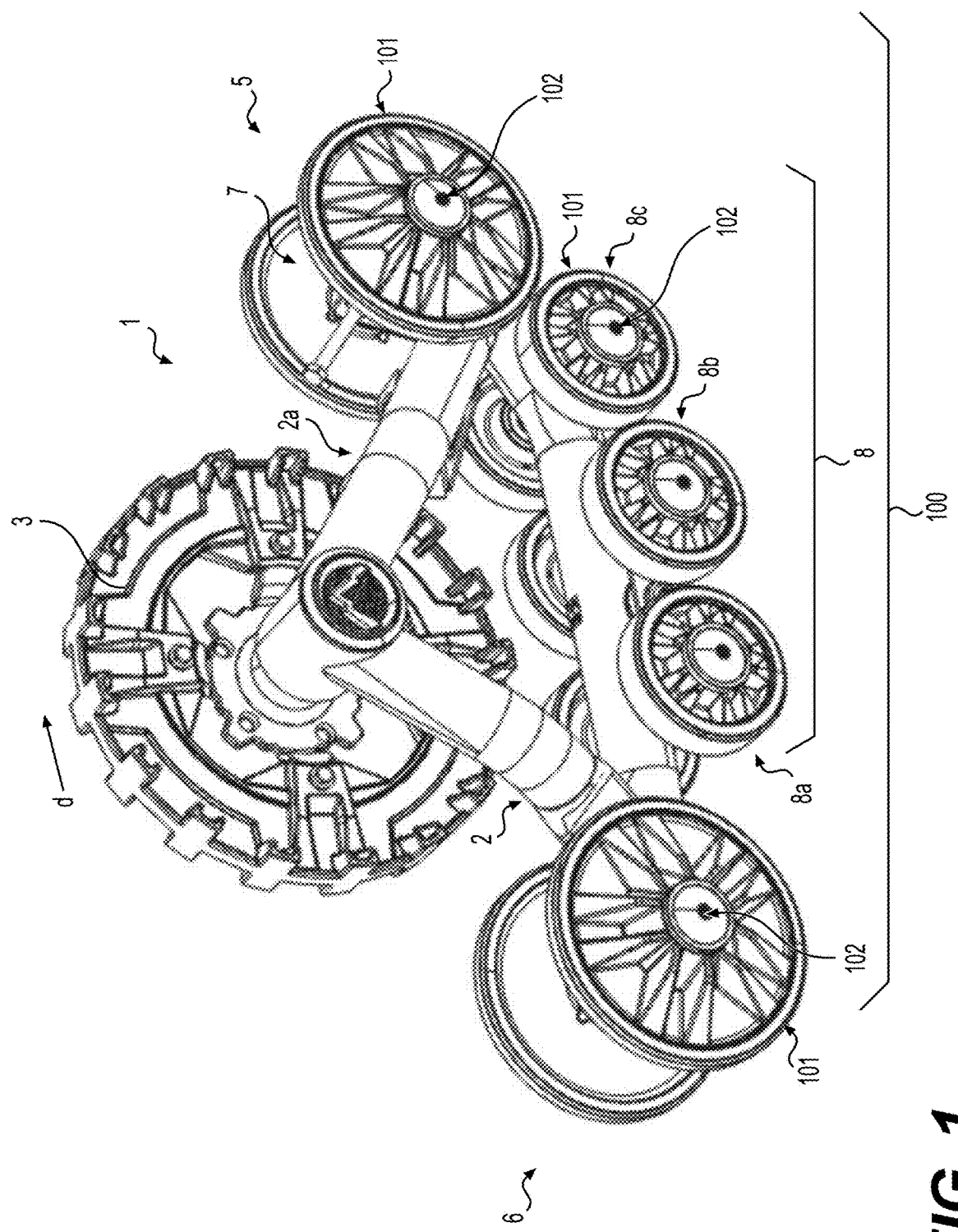
FIG. 1 is a perspective view taken from a top, rear, right side of a track system assembly configured to be connected to a right side of a vehicle, with the resilient track omitted.

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure in which variations and additions do not depart from the present technology. Hence, the following description is intended to illustrate some particular embodiments of the technology, and not to exhaustively specify all permutations, combinations and variations thereof.

As used herein, the singular form "a", "an" and "the" include plural referents unless the context clearly dictates otherwise.

The recitation herein of numerical ranges by endpoints is intended to include all numbers subsumed within that range (e.g., a recitation of 1 to 5 includes 1, 1.25, 1.5, 1.75, 2, 2.45, 2.75, 3, 3.80, 4, 4.32, and 5).

The term "about" is used herein explicitly or not. Every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein. The term "or" as used herein should in general be construed non-exclusively. For example, an embodiment of "a composition comprising A or B" would typically present an aspect with a composition comprising both A and B. As used herein, the term "or" should, however, be construed to exclude those aspects presented that cannot be combined without contradiction (e.g., a composition pH that is between 9 and 10 or between 7 and 8).

As used herein, the term "comprise" is used in its non-limiting sense to mean that items following the word are included, but items not specifically mentioned are not excluded.

The embodiments of present technology will now be described in detail with reference to the accompanying drawings, which are provided herein for illustrative purposes only and are not intended to limit the scope of the appended claims in any sort.

Track System Assembly

The tracked vehicle (not shown) on which the present technology is installed is typically an all-terrain vehicle (e.g. ATV), or any suitable tracked vehicles known in the art, e.g. those for agricultural, industrial, recreational or sports applications, requiring an efficient, maintenance-friendly design, and cost effective pivot system to mount a ground-contacting wheel assembly on the track system assembly.

Figure 2:
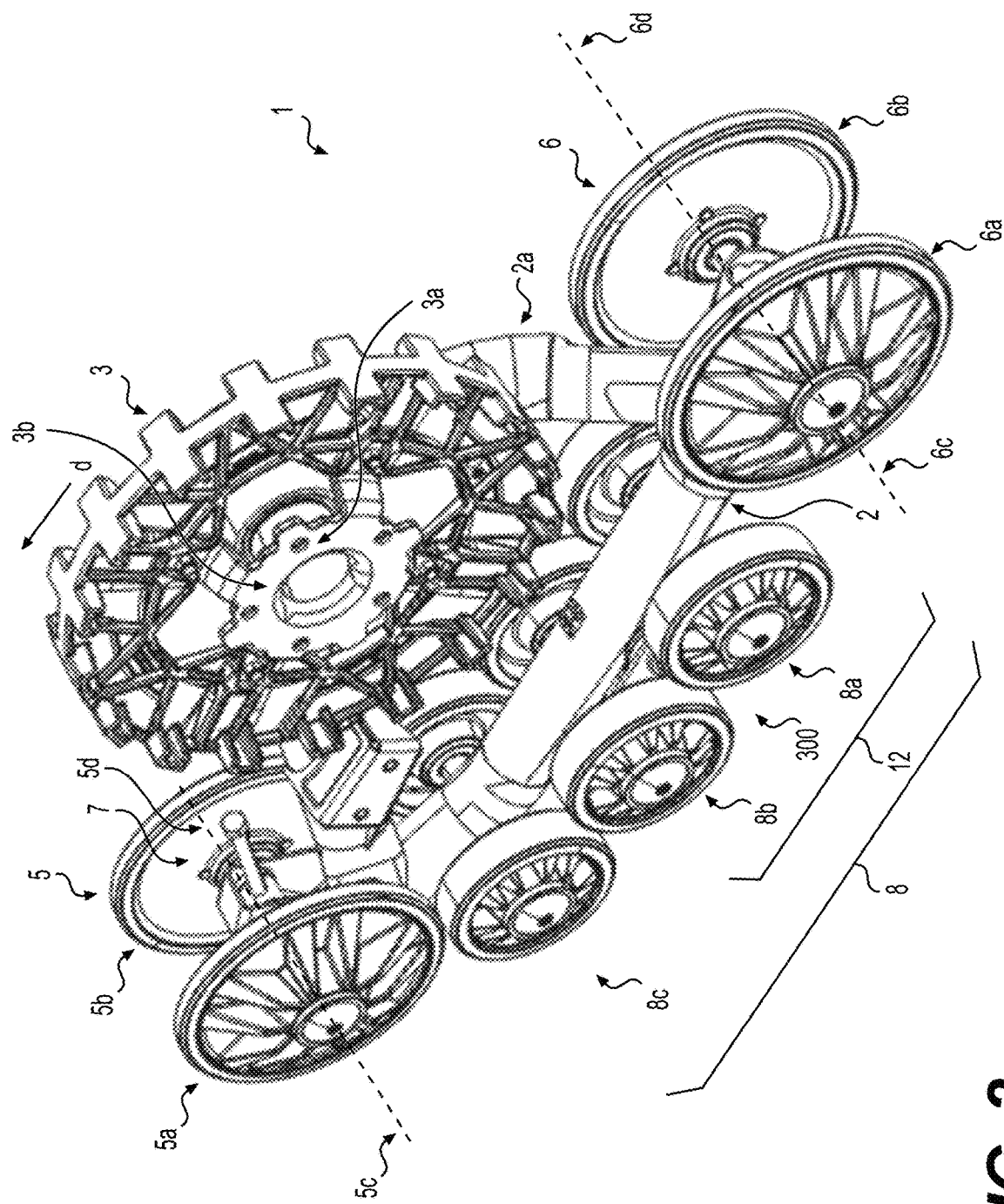
FIG. 2 is a perspective view taken from a top, rear, left side of the track system assembly of FIG. 1.

Referring to FIGS. 1 and 2, there is provided a track system assembly 1 configured to be installed on the right side of a vehicle (not shown). The forward travel direction of the track system assembly 1 is indicated by arrow d in FIGS. 1 to 4. The track system assembly 1 generally includes a frame 2 indirectly connected to the vehicle, a driving wheel 3 operatively connected to the vehicle wheel hub (not shown), a plurality of track-contacting wheel assemblies 100 for guiding a resilient track 4 (schematically shown in FIG. 3) around the track-contacting wheel assemblies 100, the track-contacting wheel assemblies 100 typically including the driving wheel 3, a leading idler wheel assembly 5, a trailing idler wheel assembly 6, and a plurality of roller wheel assemblies 8. The resilient track 4 wraps around the track-contacting wheel assemblies 100, and the track system assembly 1 further includes a tensioner 7 for adjusting and regulating tensile force applied to the resilient track 4.

Figure 3:
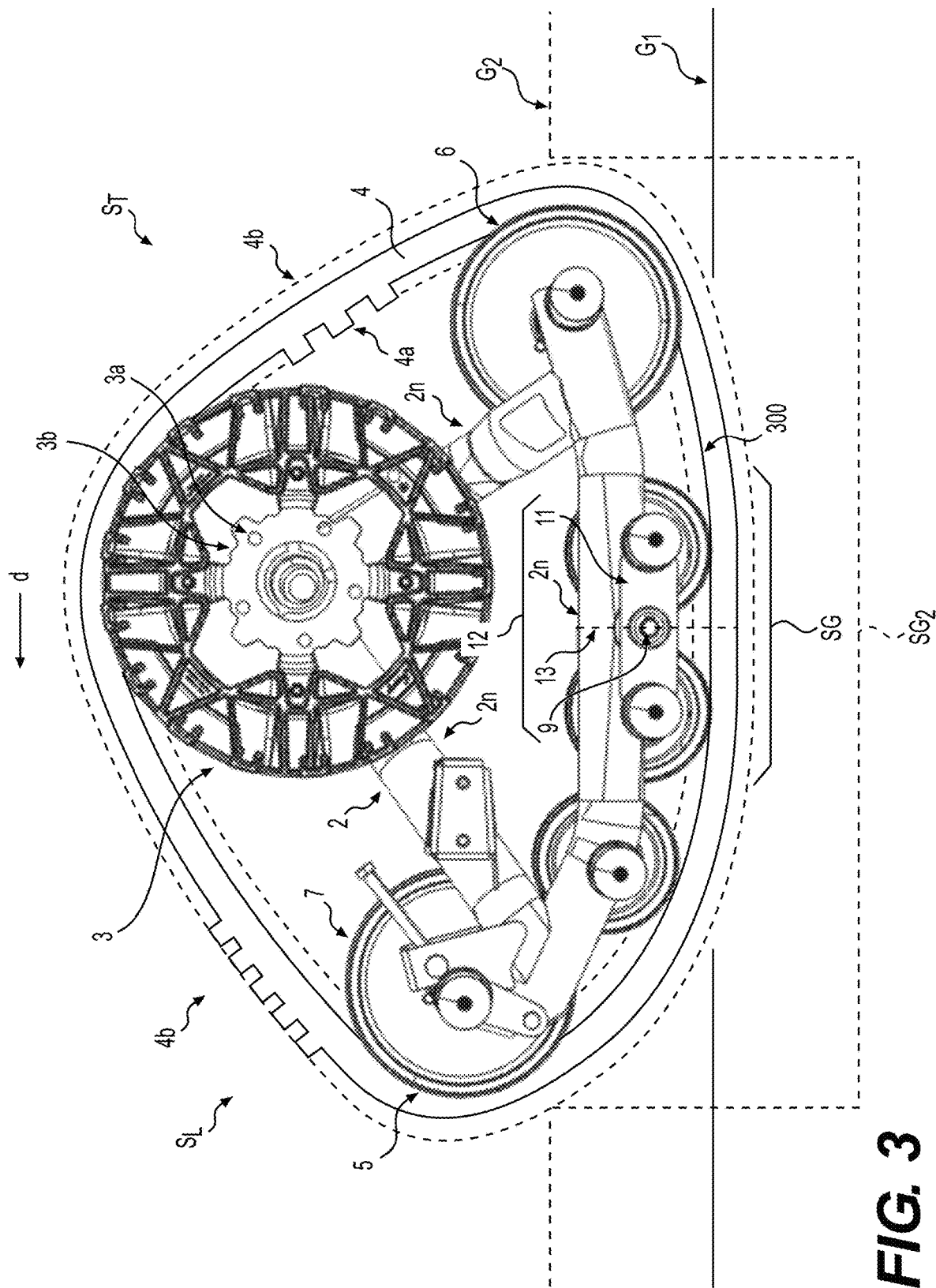
FIG. 3 is a left side elevation view of the track system assembly of FIG. 1, with the endless track and with the left idler wheels and support wheels omitted.

As best seen in FIG. 3, the present track system assembly 1 has a generally triangular shape, defined by a ground-engaging segment $S_G$ of the resilient track 4 at the lowest portion of the track system assembly 1, where the resilient track 4 is generally in contact with the ground. A leading segment $S_L$ and a trailing segment $S_T$ of the resilient track 4 are defined by the segment forward the driving wheel 3 and rearward the driving wheel 3, respectively, on each side of the ground-engaging segment $S_G$. The leading segment $S_L$ is typically connecting the upper apex (i.e. top of the driving wheel 3) to the beginning of the ground-engaging segment $S_G$, while the trailing segment $S_T$ is typically connecting the upper apex (i.e. top of the driving wheel 3)—and thus the leading segment $S_L$—to the end of the ground-engaging segment $S_G$.

When the track system assembly 1 is operated on a hard surface $G_1$ (e.g. paved road, etc.), the ground-engaging segment $S_G$ is generally in contact with the hard surface, while leading segment $S_L$ and trailing segment $S_T$ are generally not.

When the track system assembly 1 is operated over a soft surface $G_2$ (e.g. mud, sand, snow, etc.), a portion of the leading segment $S_L$ and/or a portion of the trailing segment $S_T$ may be in contact with the ground. It is understood that under these circumstances, the ground-engaging segment $S_G$ may be extended to include such additional portion(s). That case is illustrated by the ground-engaging segment $S_{G2}$, in FIG. 3 for illustrative purposes. It is understood that different configurations are considered to be within the scope of the present technology.

In the present embodiment, the leading idler wheel assembly 5 is located at the foremost portion of the track system assembly 1.

In the present embodiment, the trailing idler wheel assembly 6 is located at the rearmost portion of the track system assembly 1.

In one embodiment, the track system assembly 1 does not comprise a trailing idler wheel assembly 6.

The track system assembly 1 typically includes a plurality of roller wheel assemblies 8 (FIGS. 1 and 2) configured to support a material portion of the weight of the vehicle and to transfer that material portion of the weight as evenly as possible to the resilient track 4, and in turn to the ground.

In the present embodiment, the plurality of roller wheel assemblies 8 comprises three sets of roller wheel assemblies 8a, 8b and 8c. In this embodiment, roller wheel assemblies 8a, 8b are interconnected via a tandem assembly 12, while the roller wheel assembly 8c is independently connected to the frame 2.

The tandem assembly 12 is operatively connected to the frame 2 via a pivot assembly 200 in order to allow simultaneously rotational and/or translational motion of the tandem assembly 12 relative to the frame 2. In one embodiment, the tandem assembly 12 is limited to some rotational motion only, by configuring a resilient body 201 thereof (FIG. 6) accordingly or by integrating mechanical stoppers limiting some translational motion, for instance.

In other embodiments, more or less than three roller wheel assemblies 8 are present in the track system assembly 1, each of them being independently connected to the frame 2 or interconnected to the frame 2 via more or less tandem assemblies 12.

Frame

The frame 2 supports and maintains relative position of the different parts of the track system assembly 1, including the driving wheel 3, the leading idler wheel assembly 5, the trailing idler wheel assembly 6, the roller wheel assemblies 8, the pivot assembly 200, and the tensioner 7.

In the present embodiment, the frame 2 is made of members $2_n$ connected together. Members $2_n$ are generally made of metallic material e.g. aluminum, steel, etc. but may be made of non-metallic materials e.g. plastic, fibre reinforced resin, etc., or a combination of multiple metallic and non-metallic materials, as it is known in the art.

In the present embodiment, the members $2_n$ of the frame 2 are tubes having a hollow cross-section of circular shape. It is understood that other shapes e.g. square, rectangular, polygonal, oval, etc., and other cross-sections e.g. filled, opened (I-beam, C-beam, H-beam, etc.) may be used, as it is known in the art.

In the present embodiment, the members $2_n$ of the frame 2 are connected together by welding, but they could be connected otherwise in other embodiments of the present technology, e.g. by fastening, bonding, casting, moulding, 3d printing, or any other techniques known in the art.

It is understood that the quantity and configuration of members $2_n$ of the frame 2 may differ from the present embodiment and still be covered by the scope of the present technology.

Track-Contacting Wheel Assembly

As shown in FIG. 1, the track-contacting wheel assembly 100 generally includes at least one wheel 101 and an axle 102. It is understood by the person skilled in the art that the track-contacting wheel assembly 100 comprises parts, hardware and/or fasteners (e.g. bearing, bushing, clips, seals, lubricant, etc.) in order to permit the at least one wheel 101 to be operative and rotatably connected to the frame 2—i.e.

to roll around its respective axis of rotation defined by the axle 102. The axes of rotation of each axle 102 are not illustrated nor described herein for clarity purposes. The track-contacting wheel assembly 100 is in contact with the resilient track 4.

It is understood that a track-contacting wheel assembly 100 can include a leading idler wheel assembly 5 wherein the at least one wheel 101 includes a leading idler wheel 5a and a leading idler wheel 5b (FIG. 2); a trailing idler wheel assembly 6 wherein the at least one wheel 101 is a trailing idler wheel 6a and a trailing idler wheel 6b (FIG. 2); a roller wheel assembly 8 wherein the at least one wheel 101 is at least one roller wheel 8i; and/or a driving wheel 3 wherein the at least one wheel 101 is the driving wheel 3.

It is therefore understood that the present track system assembly 1 comprises a plurality of track-contacting wheel assemblies 100.

Ground-Contacting Wheel Assembly

Track-contacting wheel assemblies 100 that are in contact with the ground through the ground-engaging segment $S_G$ of the resilient track 4 are referred as ground-contacting wheel assemblies 300 (FIG. 3).

In the present embodiment, the roller wheel assemblies 8a, 8b are in contact with the ground through the ground-engaging segment $S_G$ of the resilient track 4, and are thus considered as ground-contacting wheel assemblies 300. It is understood that other configurations are considered to be within the scope of the present technology. For instance, other wheel assemblies may be in contact with the ground through the ground-engaging segment $S_G$ of the resilient track 4, therefore considered as ground-contacting wheel assemblies 300 as well, such as additional roller wheel assemblies (e.g. roller wheel assembly 8c), and under some circumstances, the leading idler wheel assembly 5 and/or the trailing idler wheel assembly 6.

Driving Wheel

The driving wheel 3 is configured to be mounted to the wheel hub (not shown) of the vehicle (not shown), using bolt pattern 3a on an interface part 3b, as best shown in FIGS. 2 and 3.

It is understood by the person skilled in the art that different ways of operatively coupling the driving wheel 3 with the wheel hub of the vehicle can be used. It is also understood that the bolt pattern 3a can differ in accordance with the wheel hub of the vehicle the track system assembly 1 is to be installed on.

In one embodiment, an interface plate (not shown) may be used between the driving wheel 3 and the wheel hub of the vehicle in order to permit adaptation of the track system assembly 1 on different vehicles, from an interface point of view and/or from an overall track width point of view.

The driving wheel 3 is configured to mechanically drive the resilient track 4 around the track-contacting wheel assemblies 100 of the track system assembly 1. It is understood that the driving wheel 3 may not be operatively driving the resilient track 4, but may be entrained by the resilient track 4. For instance, that could be the case in a trailer or a towed vehicle/implement.

In the present embodiment, the driving wheel 3 is generally located at the upper portion of the track system assembly 1. It is understood by the person skilled in the art that the driving wheel 3 may be located elsewhere in the track system assembly 1.

Resilient Track

Referring to FIG. 3, the resilient track 4 is made from reinforced elastomeric materials. The resilient track 4 comprises an inner wheel-engaging surface 4a configured to be driven by the driving wheel 3 and to be guided by the track-contacting wheel assemblies 100, and an outer ground-engaging surface 4b configured to engage the ground surface over which the vehicle travels, as shown in FIG. 3.

Leading and Trailing Idler Wheel Assemblies

As best seen in FIG. 2, the leading idler wheel assembly 5 generally comprises a pair of wheels 5a, 5b configured to guide the resilient track 4 in the transversal direction of the track system assembly 1. The pair of wheels 5a, 5b includes a first leading idler wheel 5a disposed on the inward side of the frame 2 and rotating about a first leading idler wheel axis of rotation 5c, and a second leading idler wheel 5b disposed on the outward side of the frame 2 and rotating about a second leading idler wheel axis of rotation 5d which is typically coaxial with the first leading idler wheel axis 5c.

The trailing idler wheel assembly 6 generally comprises a pair of wheels 6a, 6b configured to guide the resilient track 4 in the transversal direction of the track system assembly 1. The pair of wheels 6a, 6b includes a first trailing idler wheel 6a disposed on the inward side of the frame 2 and rotating about a first trailing idler wheel axis of rotation 6c, and a second trailing idler wheel 6b disposed on the outward side of the frame 2 and rotating about a second trailing idler wheel axis of rotation 6d which is typically coaxial with the first trailing idler wheel axis 6c.

In one embodiment, the leading idler wheel assembly 5 and the trailing idler wheel assembly 6 are identical, i.e. they are generally comprising the same parts. Minor differences still can be present though, such as mirror design, variation of the wheel diameter, etc.

In the present embodiment, the leading idler wheel assembly 5 and the trailing idler wheel assembly 6 are located above the ground at different heights, and only some of the plurality of roller wheels 8 are in contact with the ground through the resilient track 4. In one embodiment, the leading idler wheel assembly 5 and/or the trailing idler wheel assembly 6 is/are also in contact with the ground.

Tensioner

In the present embodiment, the tensioner 7 (FIG. 3) is installed on the leading idler wheel assembly 5, and is configured to adjust and maintain the tension force applied in the resilient track 4. In another embodiment, the tensioner 7 can be installed on another component of the track system assembly 1.

In the present embodiment, tensioner 7 is a well-known type of tensioner using a screw to push forwardly or to pull backwardly the axle of the leading idler wheel assembly 5, varying the perimeter of the resilient track 4, i.e. the tension force borne inside of it. In one embodiment, the tensioner 7 is a different type of tensioner, such as a dampening assembly (shock spring, pneumatic, etc.) for instance.

Roller Wheel Assembly

The roller wheel assemblies 8 are located at the lowest portion of the track system assembly 1. At least some of the roller wheel assemblies 8 are generally in contact with the ground through the resilient track 4, while some of the roller wheel assemblies 8 may be located above the ground.

Figure 4:
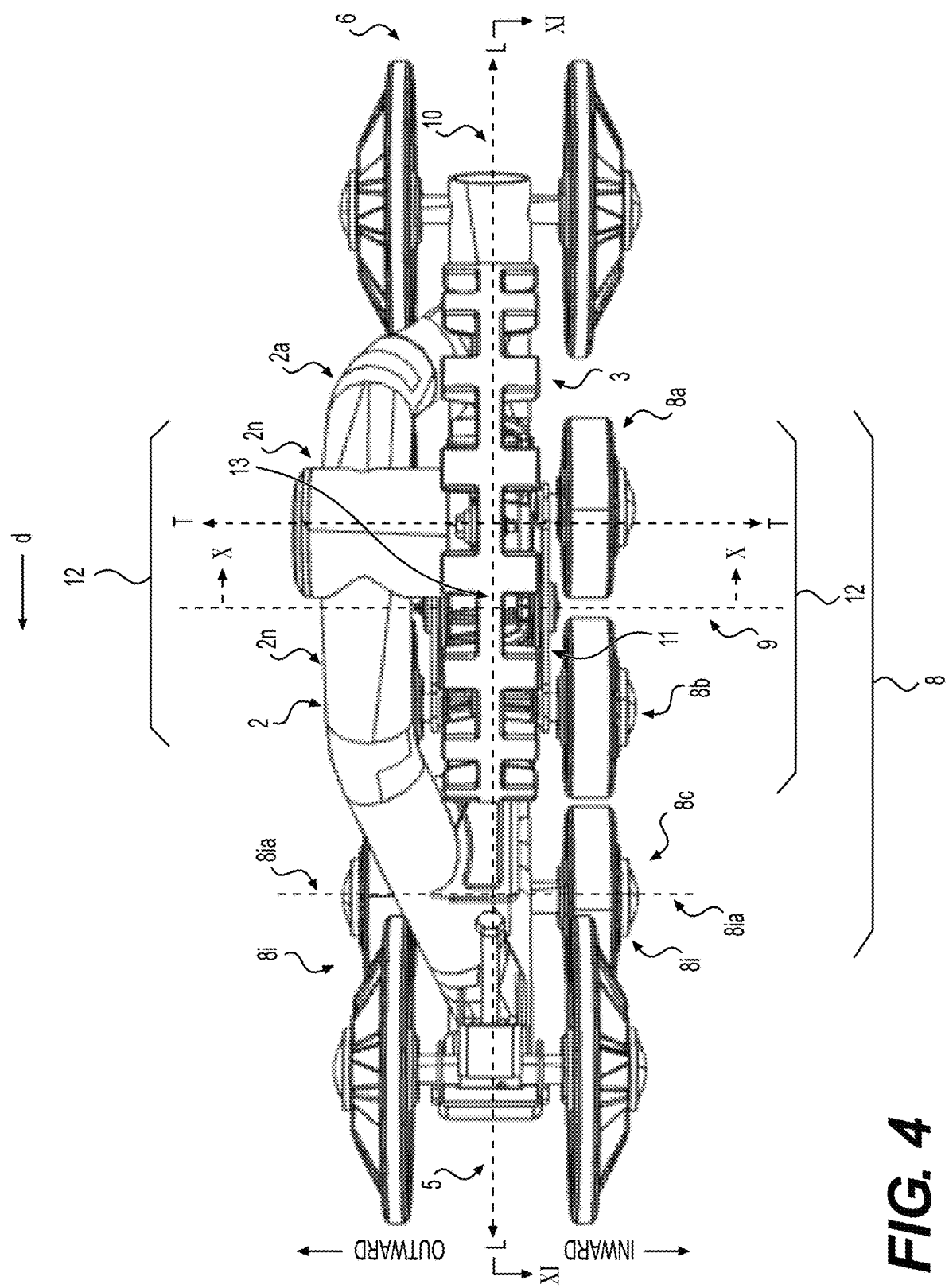
FIG. 4 is a top plan view of the track system assembly of FIG. 1.

As shown in FIG. 4, the roller wheel assembly 8 comprises a plurality of wheels 8i configured to guide the resilient track 4 in the transversal direction of the track system assembly 1.

In some circumstances, such as for the roller wheel assembly 8c, the pair of wheels 8i includes a first roller wheel 8i disposed on the inward side of the frame 2 and rotating about a first roller wheel axis of rotation 8ia (FIG. 4); and a second roller wheel 8i disposed on the outward side of the frame 2 and rotating about a second roller wheel axis of rotation 8*ia* which is coaxial with the first roller wheel axis 8*ia*, configured as a wheel set.

In some circumstances, such as for the roller wheel assemblies 8*a*, 8*b*, the plurality of wheels 8*i* are grouped and configured in a tandem assembly 12.

Tandem Assembly

Figure 5:
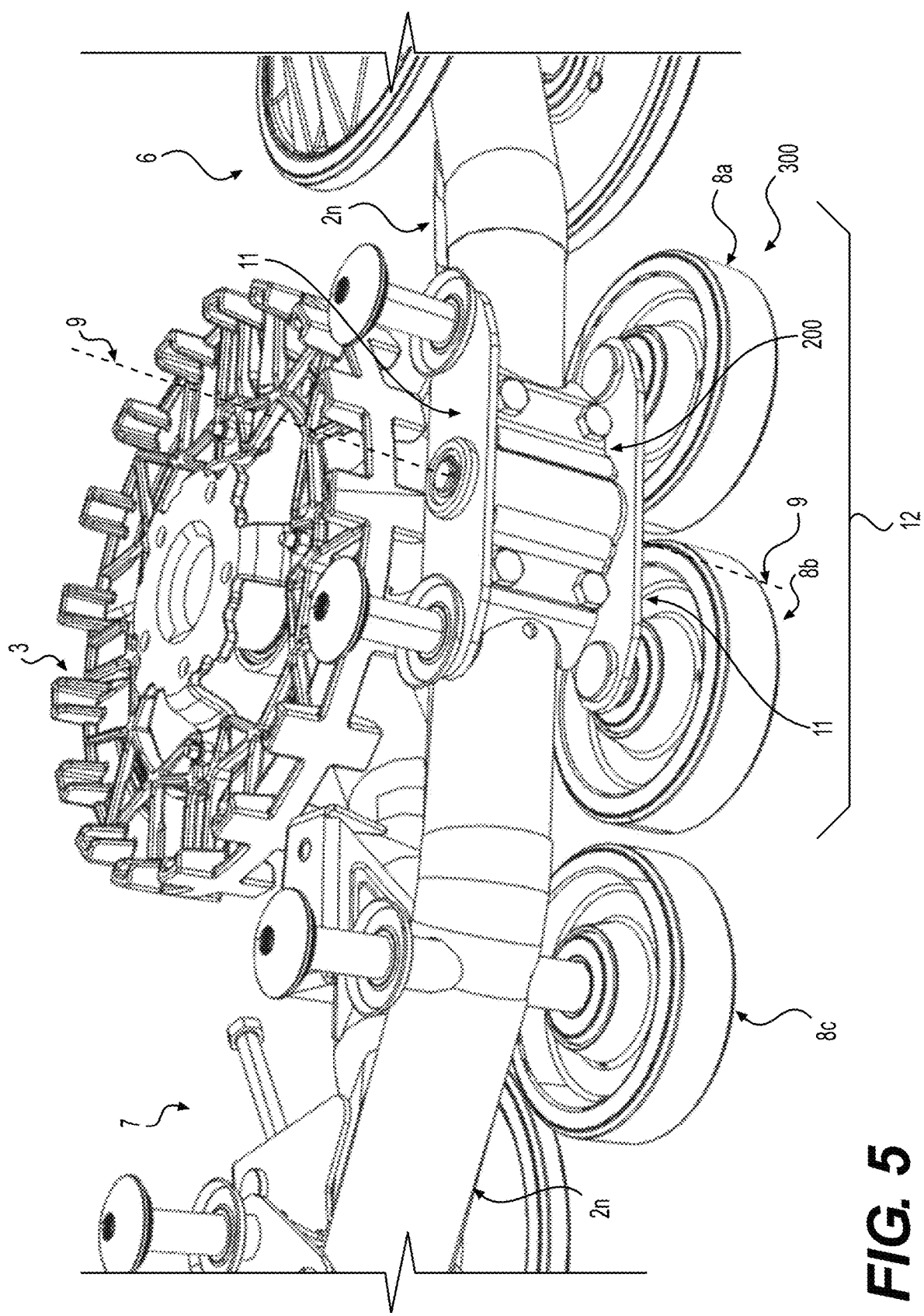
FIG. 5 is a perspective view taken from a bottom, front, left side of a portion of the track system assembly of FIG. 1, the track system assembly including a tandem assembly and a pivot assembly in accordance with a first embodiment of the present technology, with the left support wheels omitted on the tandem assembly.
Figure 6:
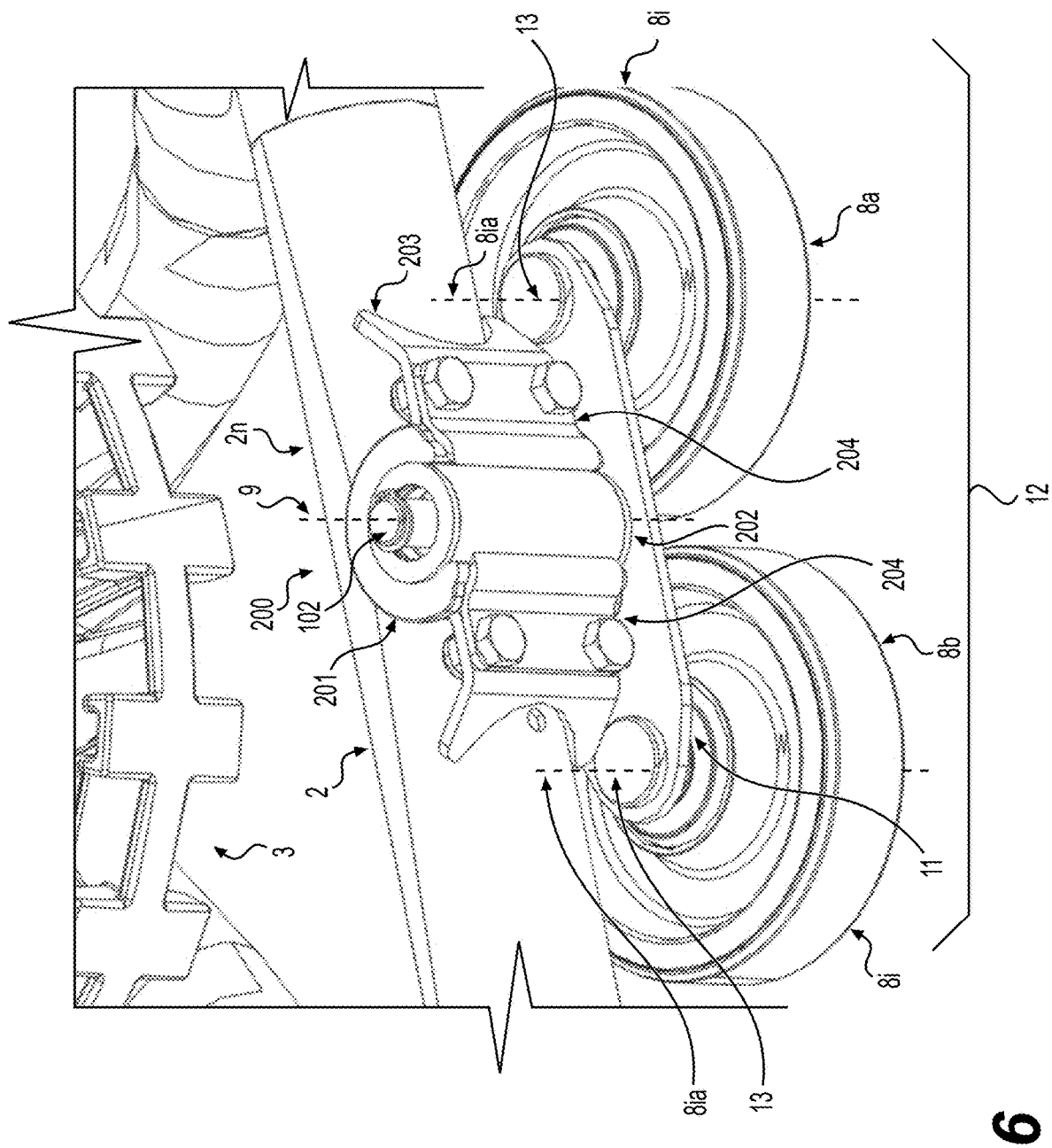
FIG. 6 is a perspective view taken from a bottom, front, left side of the portion of the track system assembly of FIG. 5, showing a close-up view of the tandem assembly and the pivot assembly, with the left support wheels omitted on the tandem assembly.

Referring to FIGS. 5 and 6, the tandem assembly 12 comprises multiple parts, including at least one support plate 11, a first roller wheel 8*i* disposed on one side of the support plate 11 and rotating about a first roller wheel axis of rotation 8*ia*, and a second roller wheel 8*i* disposed on the same side of the support plate 11 and rotating about a second roller wheel axis of rotation 8*ia* which is spaced from the first roller wheel axis 8*ia*.

The tandem assembly 12 is configured to be connected with an axle assembly 202 (FIG. 6), in order to pivot longitudinally about transverse axis 9 (i.e. pitch motion) and to pivot transversely about longitudinal axis 10 (FIG. 10) (i.e. roll motion), thanks to the pivot assembly 200.

In the present embodiment, the track system 1 includes a first pair of roller wheels 8*i* included in a first tandem assembly 12 disposed on the inward side of the frame 2, and a second pair of roller wheels 8*i* included in a second tandem assembly 12 disposed on the outward side of the frame 2. In the present embodiment, the first tandem assembly 12 and the second tandem assembly 12 are independent in that they are able to pivot freely about the transverse axis 9 they are connected to, but are transversely dependent in that they are pivoting together about the longitudinal axis 10 because they are mounted on the same axle assembly 202. In one embodiment, both first and second tandem assemblies 12 are pivoting as a single body around the transverse axis 9.

Pivot Assembly (First Embodiment)

As best shown in FIGS. 5 and 6, a first embodiment of the pivot assembly 200 is illustrated. The pivot assembly 200 is used for connecting at least one ground-contacting wheel assembly 300 to the frame 2 in a movable fashion in order to improve its pivotal motion relative to the frame 2 it is installed on by improving shock absorption and ground conformity of the ground-contacting wheel assembly 300 with an uneven ground surface.

The pivot assembly 200 comprises a resilient body 201 configured to be connected to the axle assembly 202 (or an axle 102 of a ground-contacting wheel assembly 300), a first part or base 203 configured to receive the resilient body 201, and a second part or clamping member 204 structured to at least partially retain the resilient body 201 between the base 203 and the axle assembly 202.

In the present embodiment, two tandem assemblies 12 are mounted to the frame 2 via the pivot assembly 200. In another embodiment, as mentioned above, other ground-contacting wheel assemblies 300 may additionally be mounted to the frame 2 via additional pivot assembly(ies) 200.

In the present embodiment, the rotational range of motion of a tandem assembly 12 about the transverse axis 9 (FIG. 6) (i.e. pitch motion) is allowed by rotational movement of axle 102 inside axle assembly 202. In that embodiment, the rotational movement is not limited, i.e. the axle 102 is free to spin 360 degrees about transverse axis 9. Such a rotational range of motion enhances the performance of the track system assembly 1 as the ground-contacting wheel assembly 300 can better conform to the resilient track 4 travelling on uneven terrain (such as a rocky ground surface, or a pothole for example). In one embodiment, the rotational movement of the axle 102 about the transverse axis 9 is limited to a predetermined range, e.g. by using mechanical stoppers. In one embodiment, the axle 102 is operatively connected with external surface 2021 (FIG. 14) of the axle assembly 202, resulting in a limitation of the rotational movement of the axle 102 about transverse axis 9 directed by the deformation (i.e. torsion) of the resilient body 201.

Figure 10:
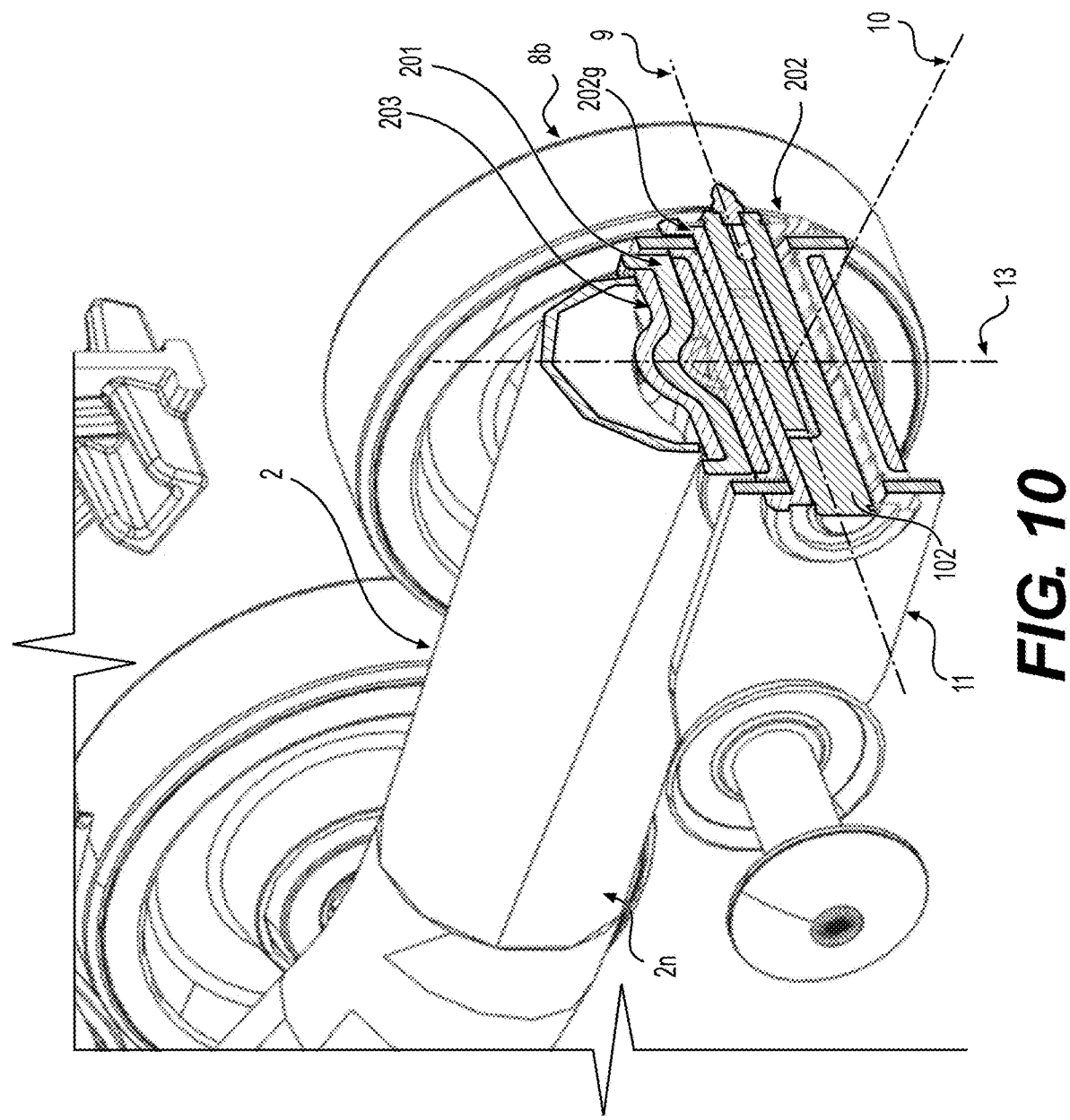
FIG. 10 is a cross-sectional, perspective view taken from a top, rear, left side of a portion of the track system assembly of FIG. 1 taken along cross-section line X-X of FIG. 4.

Referring to FIG. 10, the rotational range of motion of the tandem assembly 12 about the longitudinal axis 10 (i.e. roll motion or lateral bending) is allowed by the deformation of the resilient body 201, which gives a rotational range of motion of about +3 degrees in one direction (e.g. clockwise) and about −3 degrees in the other direction (e.g. counter-clockwise). Such a rotational range of motion enhances the performance of the track system assembly 1 as the ground-contacting wheel assembly 300 can better conform to the resilient track 4 travelling on laterally inclined terrain (such as a crowned road for example), or in certain conditions. It is to be understood that a smaller or a greater rotational range of motion of the tandem assembly about the longitudinal axis 10 is contemplated in other embodiments by configuring the resilient body 201 accordingly (i.e. different thickness, stiffness, or combination of thickness and stiffness, etc.) for instance.

Still referring to FIG. 10, the rotational range of motion of the tandem assembly 12 about the vertical axis 13 (i.e. yaw motion or longitudinal bending) is allowed by the deformation of the resilient body 201, which gives a rotational range of motion of about +1 degree in one direction (e.g. clockwise) and about −1 degree in the other direction (e.g. counterclockwise). It is to be understood that a smaller or a greater rotational range of motion of the tandem assembly 12 about the vertical axis 13 is contemplated in other embodiments. Such a rotational range of motion enhances the performance of the track system assembly 1 as the ground-contacting wheel assembly 300 can better conform to the resilient track 4 travelling on uneven terrain, or in certain conditions.

In the present embodiment, the lateral translational range of motion of the tandem assembly 12 about the transverse axis 9 is allowed by the deformation (i.e. lateral compression) of the resilient body 201, which gives about +0.030 inch in one direction (e.g. outwardly) and about −0.030 inch in the other direction (e.g. inwardly). It is to be understood that a smaller or a greater lateral translational range of motion of the tandem assembly 12 about the transverse axis 9 is contemplated in other embodiments by configuring the resilient body 201 accordingly (i.e. thickness, stiffness, or combination of thickness and stiffness, etc.) for instance.

In the present embodiment, the longitudinal translational range of motion of the tandem assembly 12 about the longitudinal axis 10 is allowed by the deformation (i.e. longitudinal compression) of the resilient body 201, which gives about +0.060 inch in one direction (e.g. forwardly) and about −0.060 inch in the other direction (e.g. backwardly). It is to be understood that a smaller or a greater longitudinal translational range of motion of the tandem assembly 12 about the longitudinal axis 10 is contemplated in other embodiments by configuring the resilient body 201 accordingly (i.e. thickness, stiffness, etc.) for instance.

In the present embodiment, the vertical translational range of motion of the tandem assembly 12 about the vertical axis 13 is allowed by the deformation (i.e. vertical compression) of the resilient body 201, which gives about +0.120 inch in one direction (e.g. upwardly) and about −0.030 inch in the other direction (e.g. downwardly). It is to be understood that a smaller or a greater vertical translational range of motion of the tandem assembly 12 about the vertical axis 13 is contemplated in other embodiments.

The translational range of motions described above allow the pivot assembly 200 to absorb or mitigate at least some of the shocks and vibrations the ground contacting wheels 300 may be subjected to, and thus reduce the amount of shocks and vibrations transferred to the frame member 2n of the track system assembly 1. This shock and vibration absorption feature may assist in reducing the wear of certain components of the track system assembly 1 and/or of the vehicle.

Base (First Embodiment)

Figure 9:
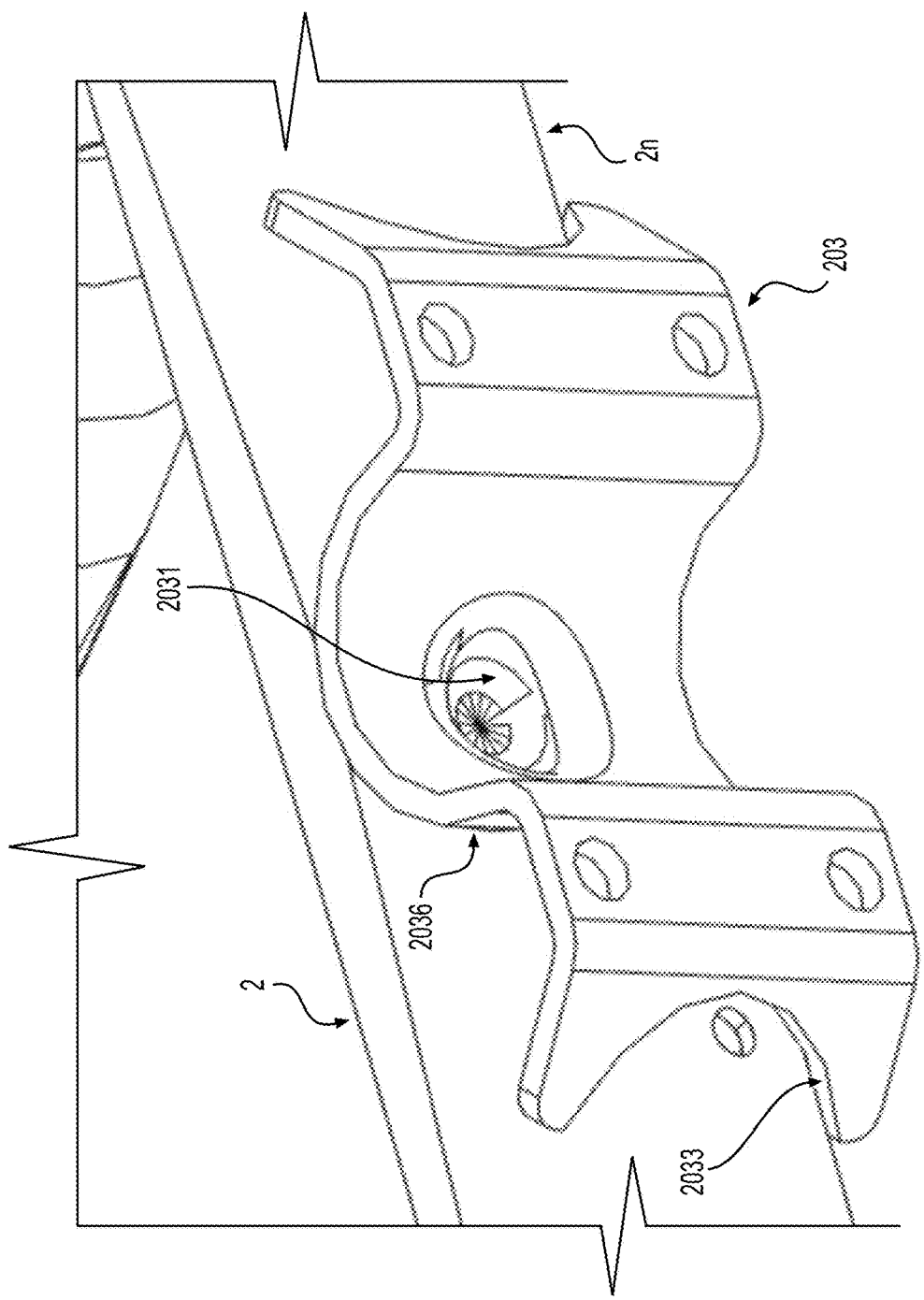
FIG. 9 is a perspective view taken from a bottom, front, left side of a portion of the pivot assembly of FIG. 6, with the second part (clamping members), the axle assembly and the resilient body omitted.

A first embodiment of the base 203 of the pivot assembly 200 is configured to be connected permanently (e.g. welding, bonding, moulding, etc.) or temporarily (e.g. fastened, clamped, snapped, etc.) to the frame 2 as shown in FIG. 9. In the present embodiment, connecting the base 203 with the frame 2 is made using interface portion 2033 and the external surface portion 2036, best seen in FIGS. 20 to 22. It is to be understood that other configurations and shapes meeting the coupling purpose are considered to be covered by the present technology.

Figure 24:
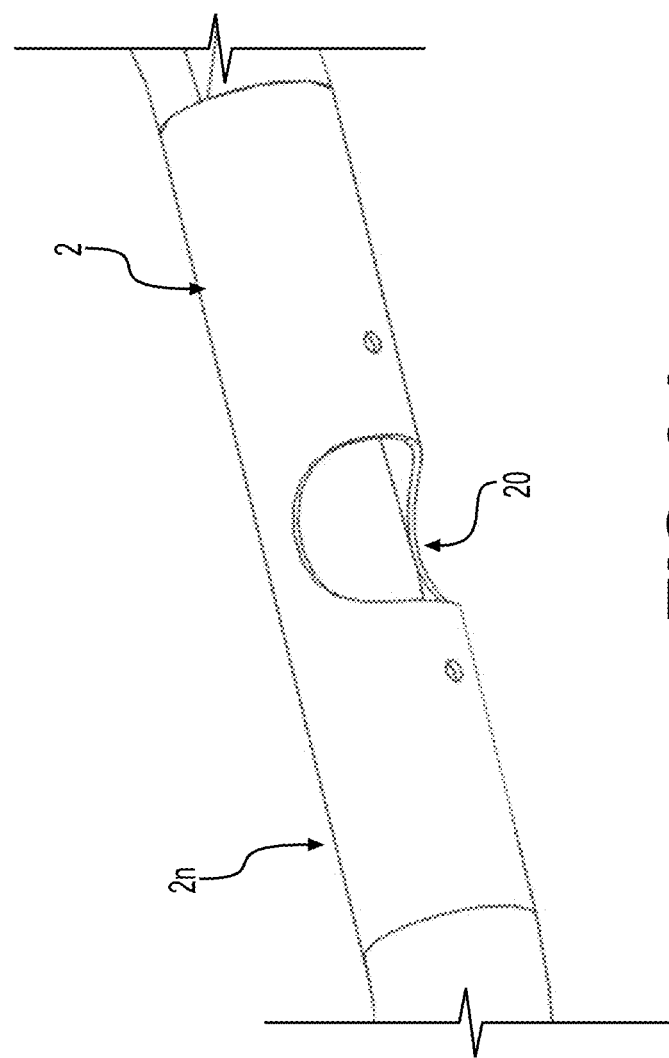
FIG. 24 is a perspective view taken from a bottom, front, left side and a left side elevation view of the frame, showing a frame member configured to receive the pivot assembly.
Figure 25:
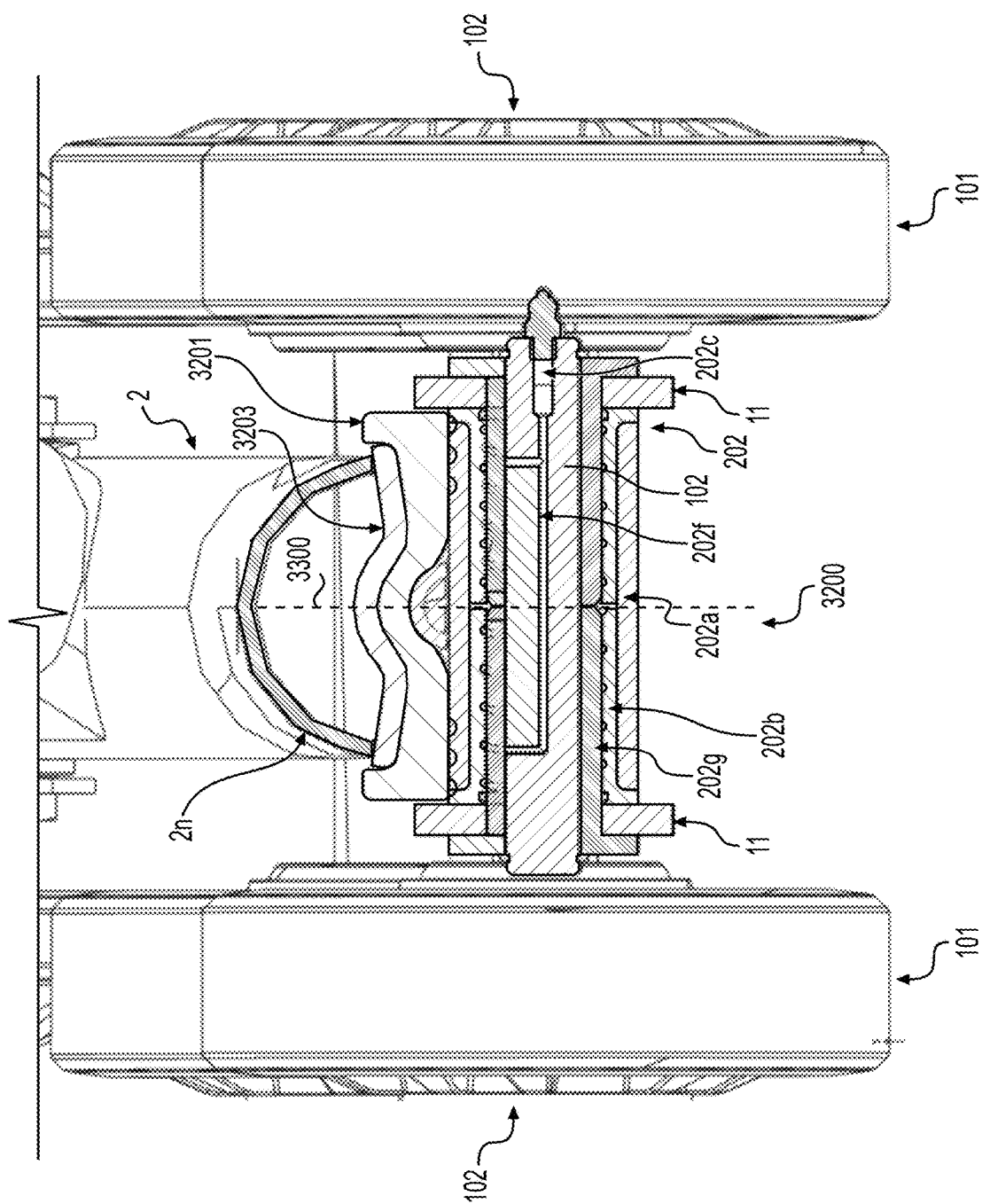
FIG. 25 is a cross-sectional view of a portion of the track system assembly of FIG. 1 taken along cross-section line X-X of FIG. 4, with a pivot assembly in accordance with a second embodiment of the present technology.
Figure 26:
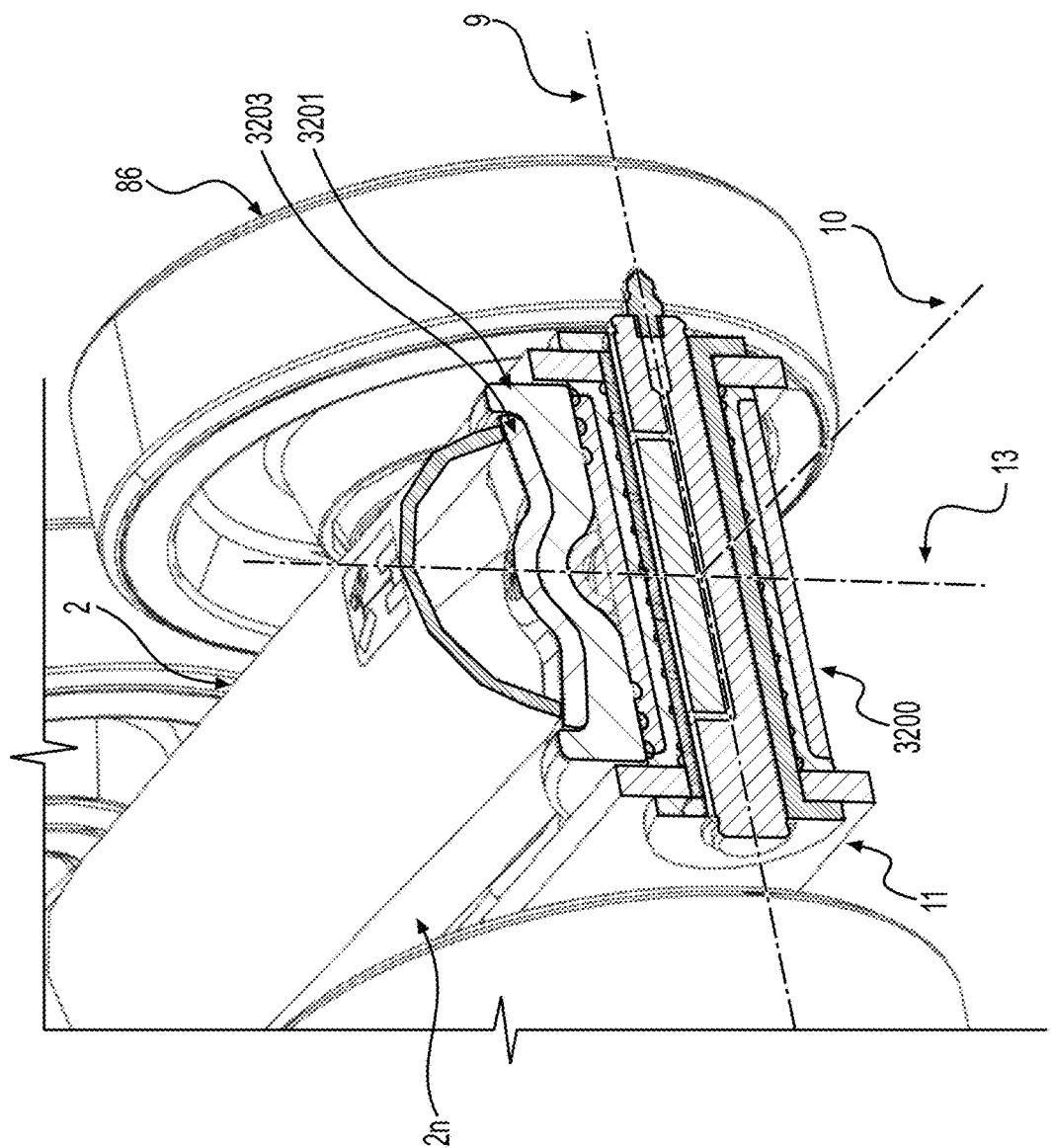
FIG. 26 is a cross-sectional, perspective view taken from a top, rear, left side of a portion of the track system assembly of FIG. 1 taken along cross-section line X-X of FIG. 4, with the pivot assembly of FIG. 25.

In the present embodiment, the frame 2 is configured to receive the base 203 in a cut-out 20 defined in the lower member 2n, like the one shown in FIG. 24 for illustrative purposes. The external surface portion 2036 is generally complementary to the shape of the cut-out 20.

In one embodiment, the base 203 is an integral part of the frame 2. In other words, the frame 2 is configured to receive the components of the pivot assembly 200 (e.g. resilient body 201, axle assembly 202, second part 204, etc.). Some of those components may then be directly connected to the frame 2, permanently (e.g. welding, bonding, moulding, 3D printed, etc.) or temporarily (e.g. fastened, clamped, snapped, etc.).

As best seen in FIG. 6, the base 203 is configured to be connected to the frame 2 and to receive other components of the pivot assembly 200, including the resilient body 201, and the clamping members 204.

Figure 13:
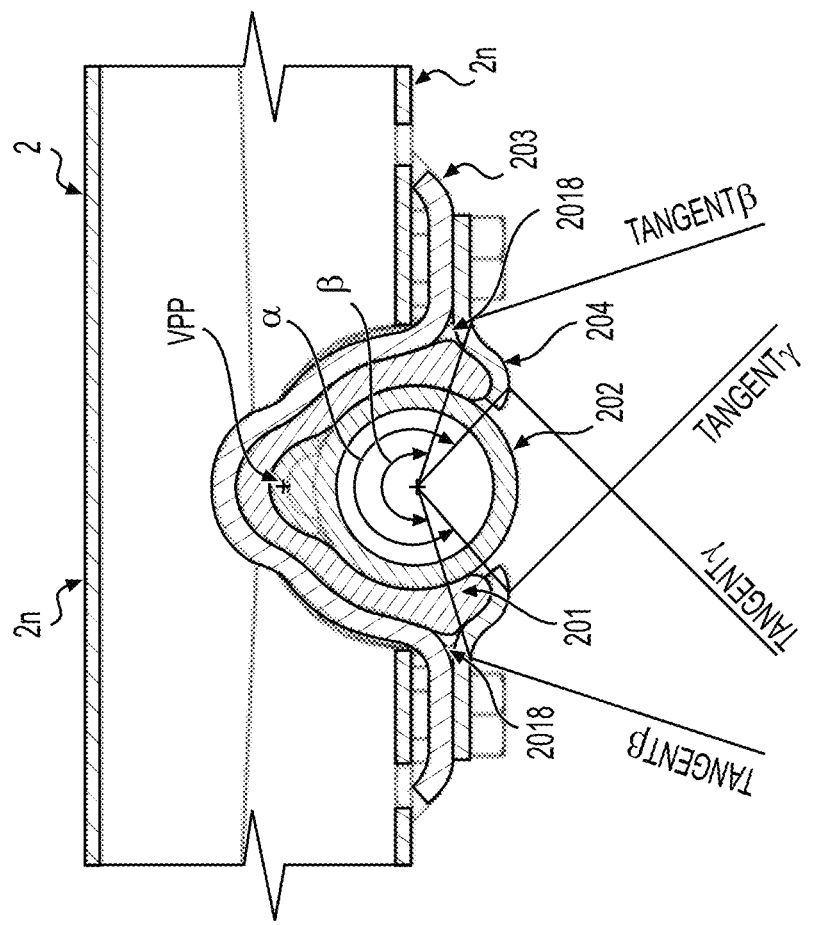
FIG. 13 is a normal cross-sectional view of a portion of the track system assembly of FIG. 1, showing a longitudinal cross-section view taken along cross-section line XI-XI of FIG. 4 of the pivot assembly without the tandem assembly and the internal components of the axle assembly.

Referring now to FIG. 13, a wrap angle β of the base 203 over the resilient body 201 is greater than 180 degrees, with lines Tangent β projecting from the base 203 being divergent with one another. The wrap angle β of the base 203 is also smaller than 360 degrees. In another embodiment, the wrap angle β may be less than 180 degrees and/or the projecting lines tangent β may be converging as well. In the present embodiment, the clamping members 204 are not necessarily required to hold the resilient body 201 in the base 203, since the wrap angle β creates a "snapping effect" (i.e. elastic deformation of the base 203 permitting insertion of components of the pivot assembly 200 by force inside a centred concave portion 2031 of the base 203 seen in FIG. 20) that is strong enough to retain the other components of the pivot assembly 200 in place thanks, among others, to the reaction force of the track system 1 on the ground.

In the present embodiment, the base 203 is generally made of metallic material, such as steel. In other embodiments, the base 203 may be made of other metallic material e.g. aluminum, etc. but may also be made of non-metallic materials e.g. plastic, fibre reinforced resin, etc., or a combination of multiple metallic and non-metallic materials, as known in the art.

Referring to FIG. 9, the base 203 has a generally centred concave portion 2031 to receive a portion of the resilient body 201.

Figure 20:
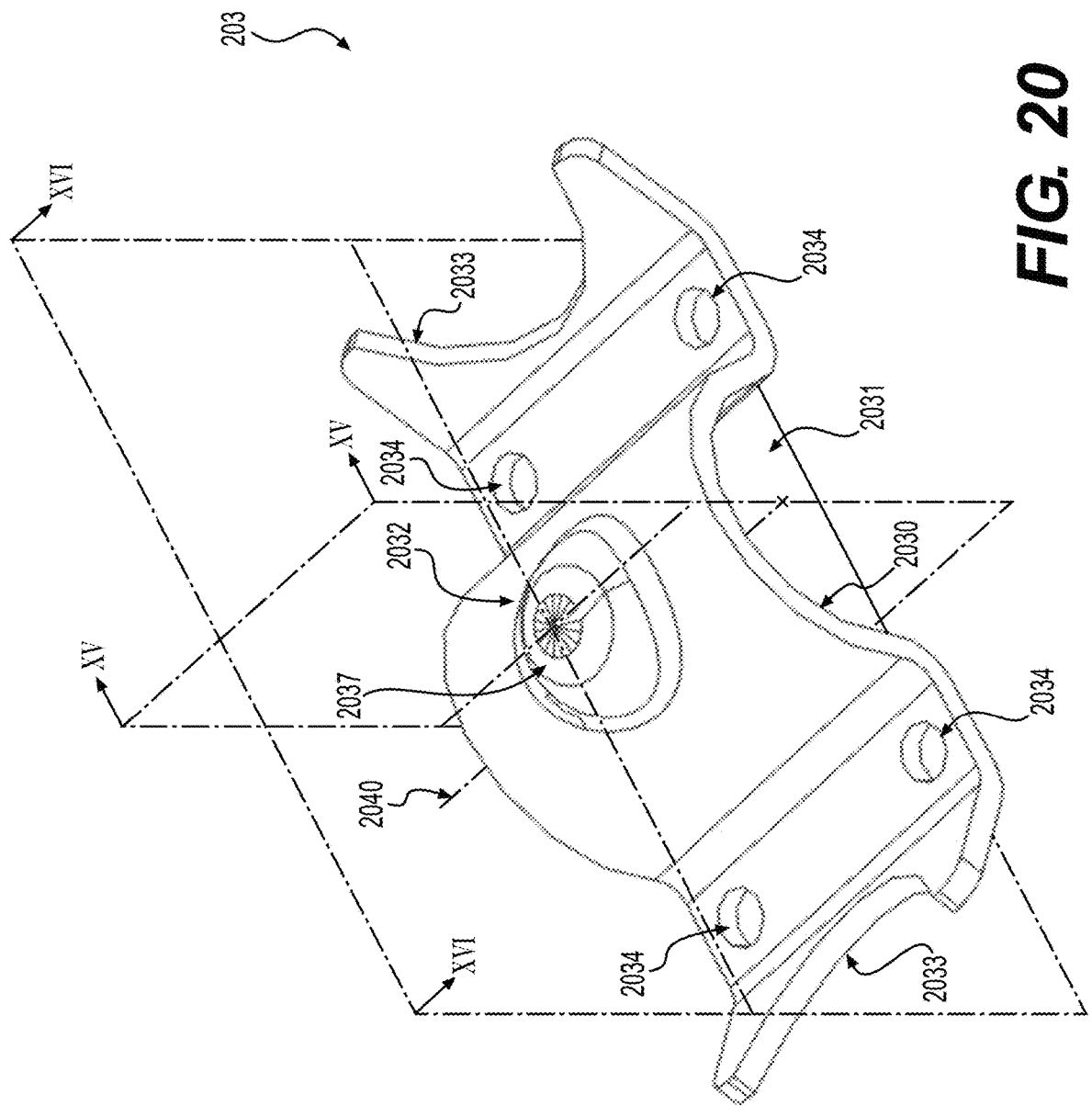
FIG. 20 is a perspective view taken from a top, front, left side of a first part (base) of the track system assembly of FIG. 1.

Referring to FIG. 20, an interlocking member 2032 is present in the concave portion 2031 in order to position the uppermost portion of the resilient body 201 inside the concave portion 2031 and to limit relative movement between the resilient body 201 and the base 203 along and about transverse axis 2040. In the present embodiment, the transverse axis 2040 is coaxial with the transverse axis 9. In other embodiments, the interlocking member 2032 is rather a plurality of interlocking members 2032, disposed in the concave portion 2031 of the base 203.

Figure 16:
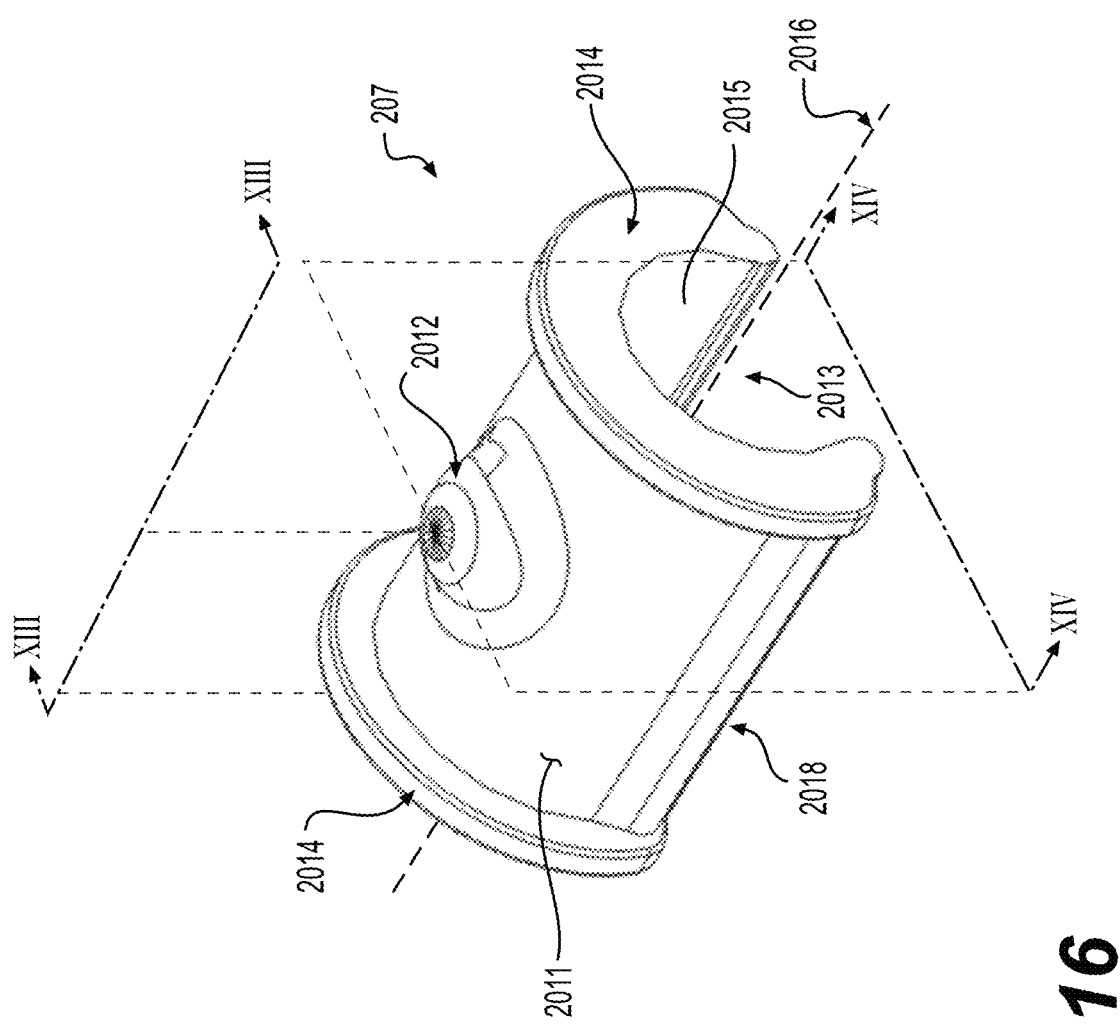
FIG. 16 is a perspective view taken from a top, front, left side of a resilient body of the track system assembly of FIG. 1.
Figure 17:
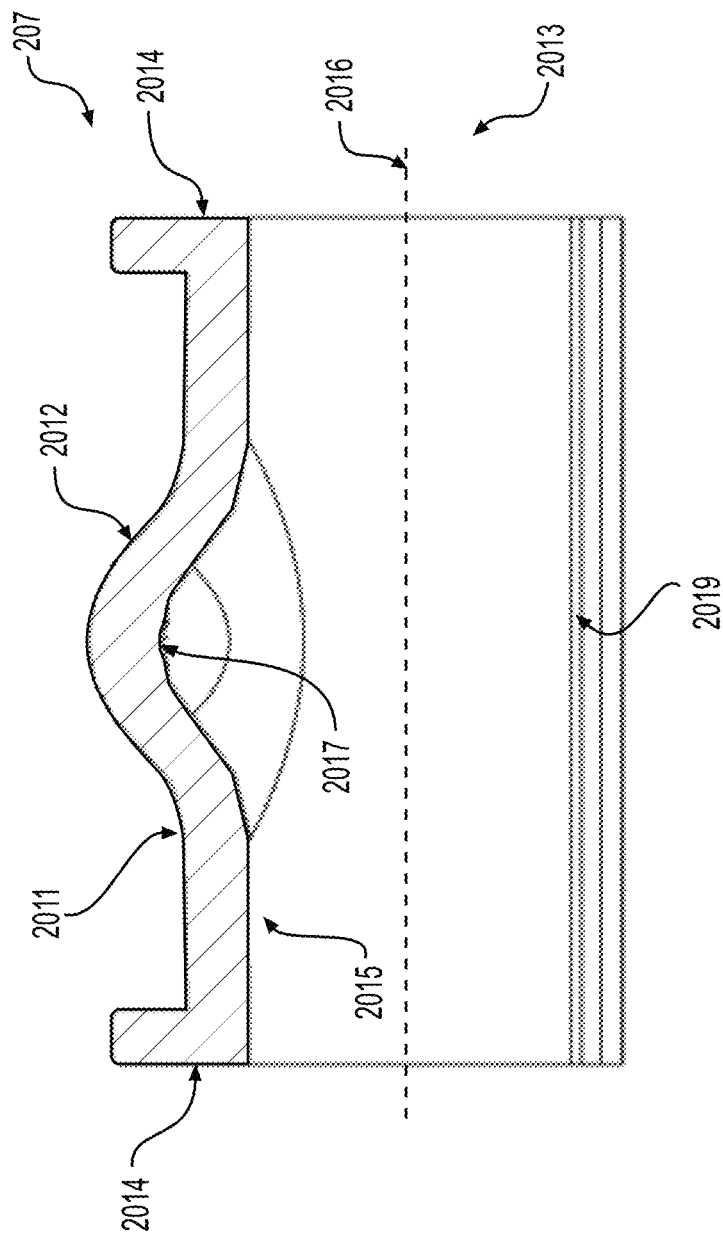
FIG. 17 is a longitudinal cross-sectional view taken along cross-section line XIII-XIII of FIG. 16 of the resilient body.
Figure 18:
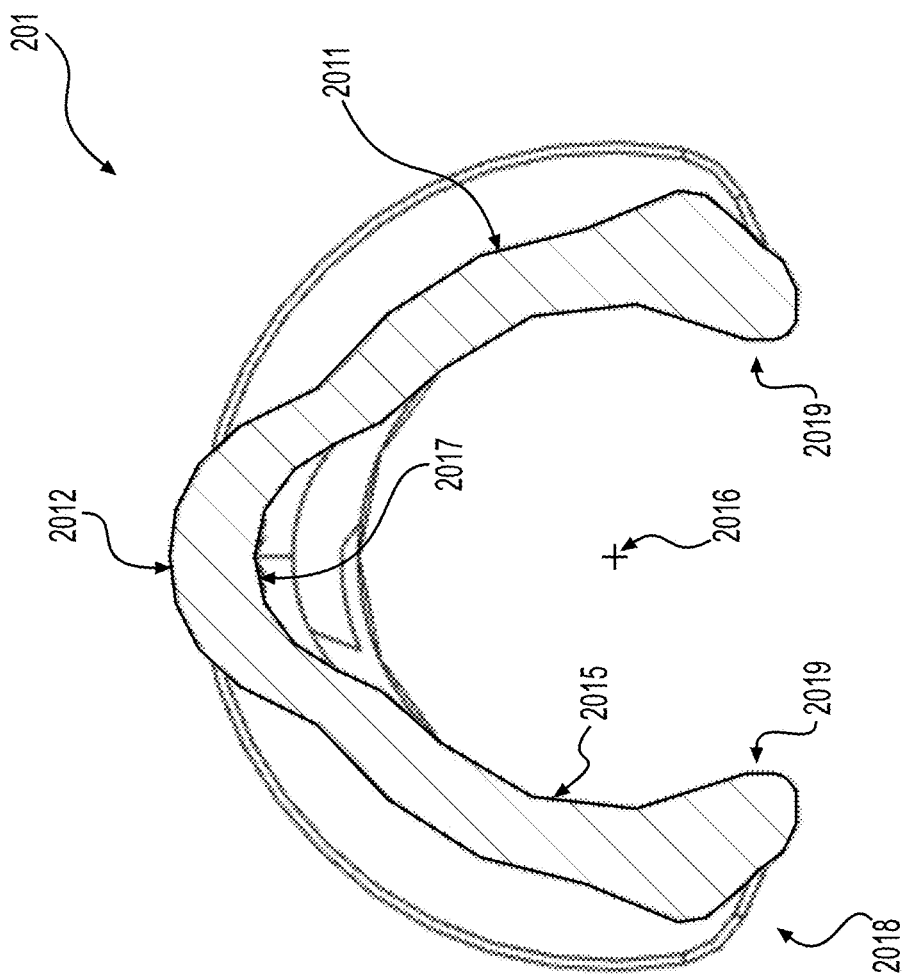
FIG. 18 is a transversal cross-sectional view taken along cross-section line XIV-XIV of FIG. 16 of the resilient body.
Figure 21:
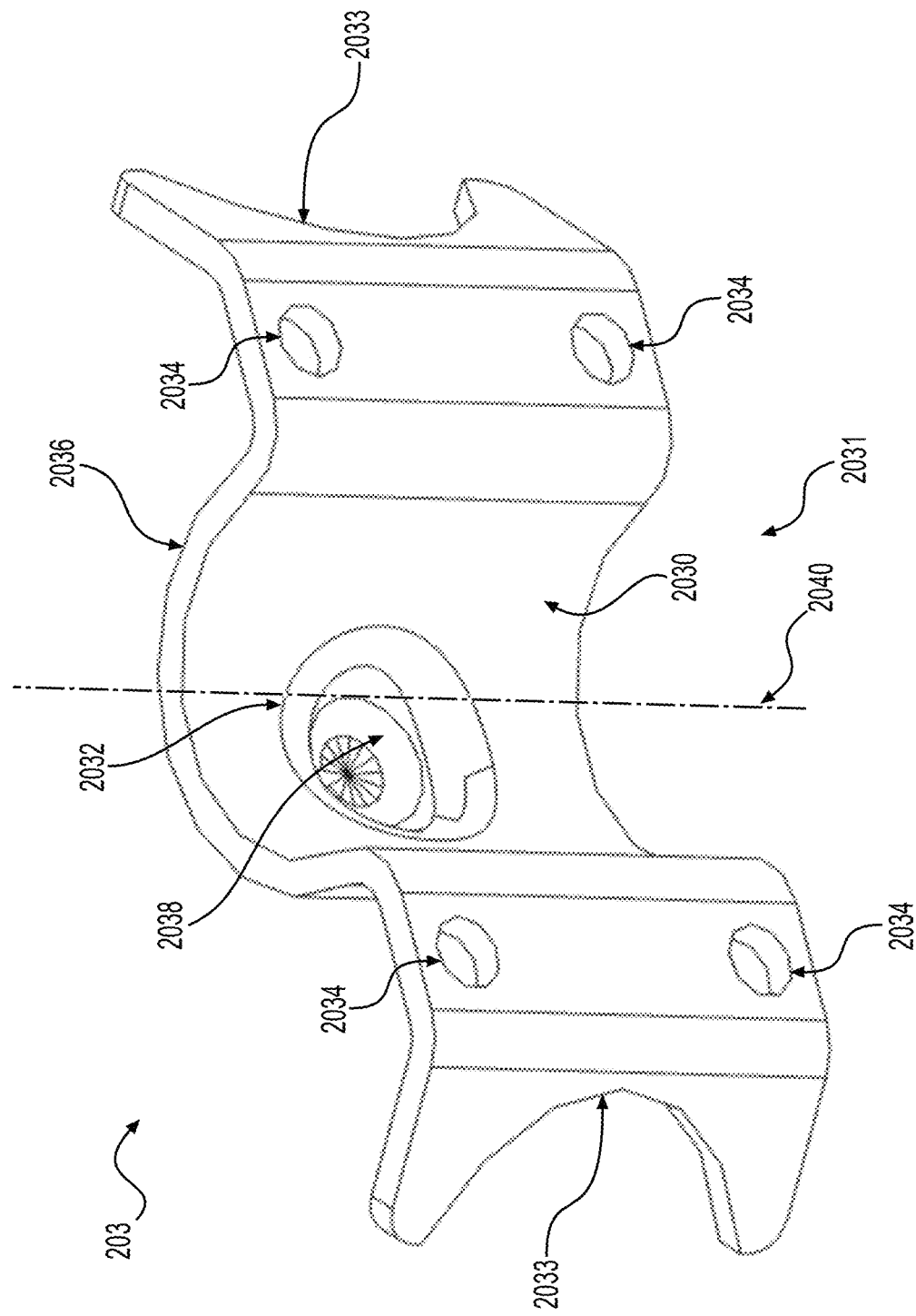
FIG. 21 is a perspective view taken from a bottom, front, left side of the first part (base) of FIG. 20, showing the concave portion of the first part (base)
Figure 22:
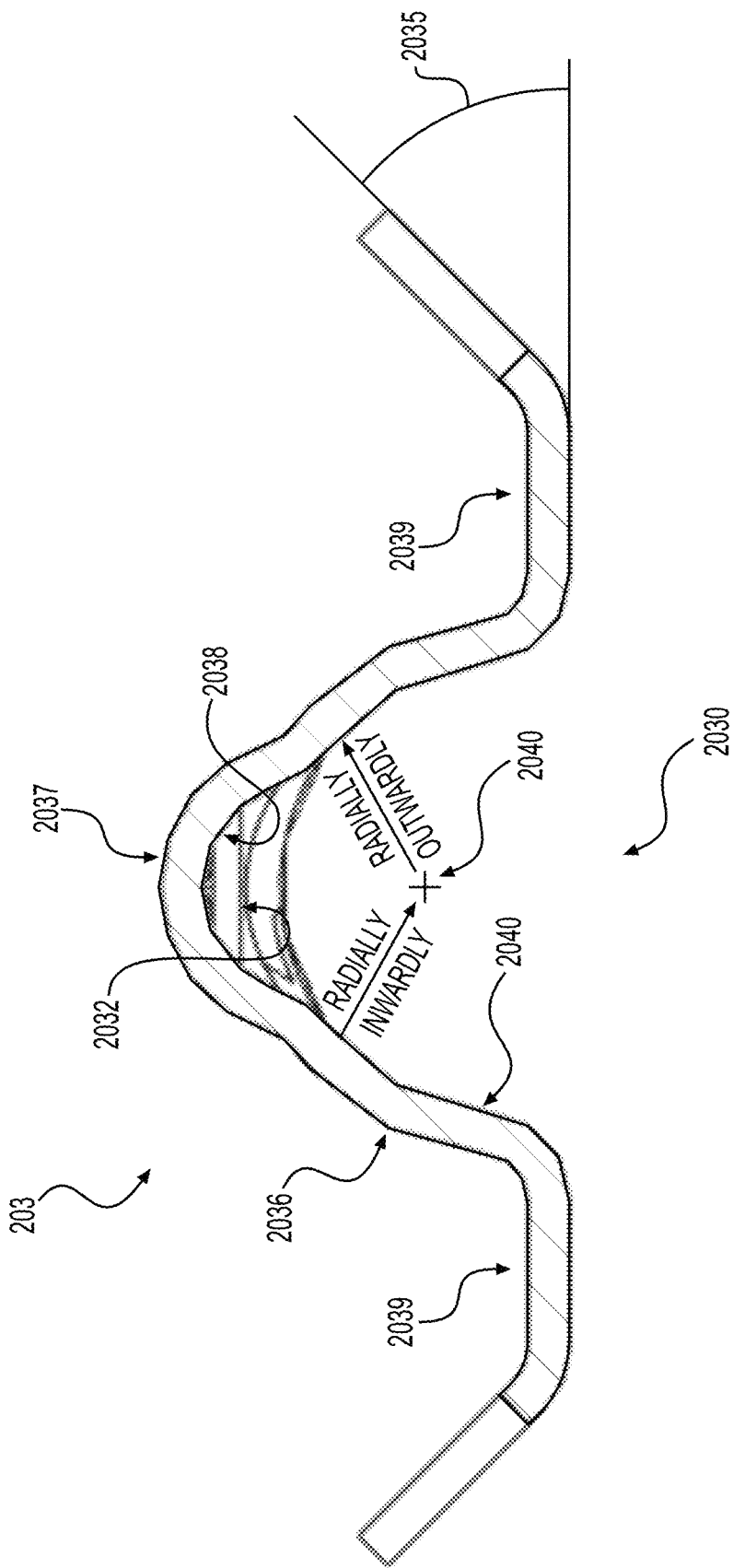
FIG. 22 is a longitudinal cross-sectional view taken along cross-section line XVI-XVI of FIG. 20 of the first part (base) of FIG. 20.

Referring to FIGS. 21 and 22, the interlocking member 2032 creates a negative geometry 2038 (i.e. concave/female geometry) generally protruding radially outwardly from the internal surface 2030 of the concave portion 2031 of the base 203 that will match at least partially with a generally complementary positive geometry (i.e. convex/male geometry) protruding radially outwardly from the external surface 2011 of the resilient body 201 (FIGS. 16 to 18).

In one embodiment, the interlocking member 2032 creates a positive geometry (i.e. convex/male geometry) generally protruding radially inwardly from the internal surface 2030 of the concave portion 2031 of the first part 203 that will match at least partially with a generally complementary negative geometry (i.e. concave/female geometry) protruding radially inwardly from the external surface 2011 of the resilient body 201.

In one embodiment, the interlocking member 2032 is a hole or a cut-out defined in the concave portion 2031, which creates negative geometry (i.e. concave/female geometry) that will match at least partially with a generally complementary positive geometry (i.e. convex/male geometry) protruding radially outwardly from the external surface 2011 of the resilient body 201.

In one embodiment, the base 203 does not have an interlocking member 2032, and the concave portion 2031 has a cross-section generally constant.

Figure 23:
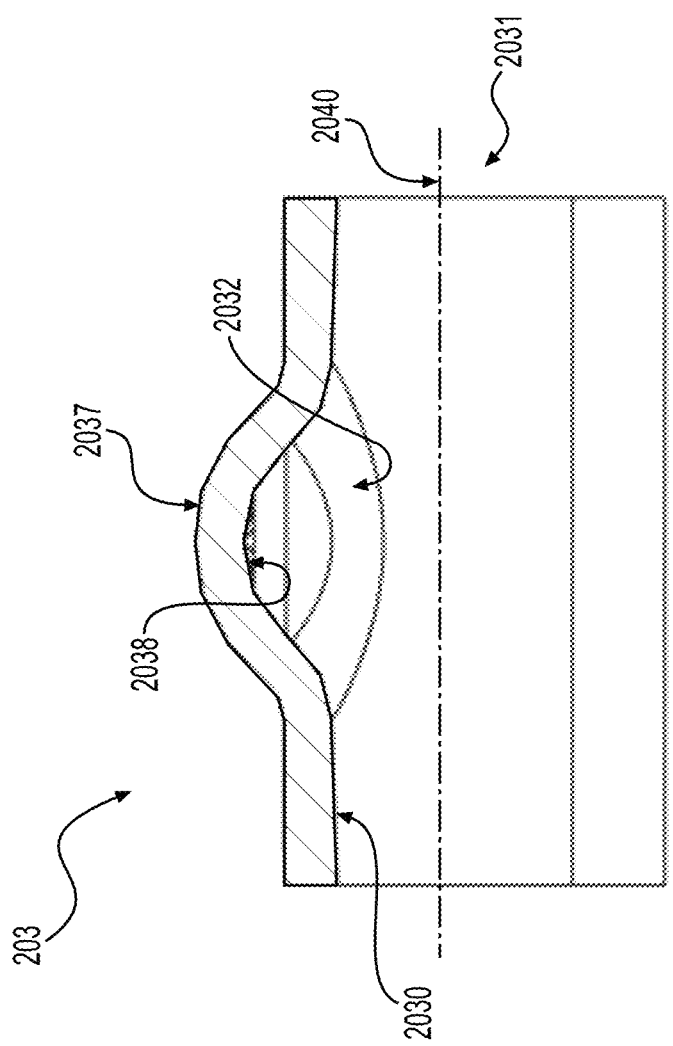
FIG. 23 is a transversal cross-sectional view taken along cross-section line XV-XV of FIG. 20 of the first part (base) of FIG. 20.

In the present embodiment, the interlocking member 2032 has a generally hemispherical shape and is a local and secluded deformation or boss of the internal surface 2030 and/or external surface 2036 of the base 203, in such a way that the interlocking member 2032 locally modifies the cross-section of the base 203, as best seen in FIGS. 22 and 23.

In other embodiments, the interlocking member 2032 could have a different shape, e.g. prismatic, oval, oblong, square, polygonal, etc.

Referring to FIGS. 20 to 22, the base 203 is configured to interface with the clamping members 204 via the interface portion 2034 on the flange portions 2039. The interface portion 2034 generally comprises a bolt pattern to fasten the base 203 and the clamping members 204 together. In the present embodiment, bolts and nuts are used to connect the base 203 and the clamping members 204.

In one embodiment, the interface portion 2034 is used to connect the base 203 and the clamping members 204 to the frame 2.

Figure 12:
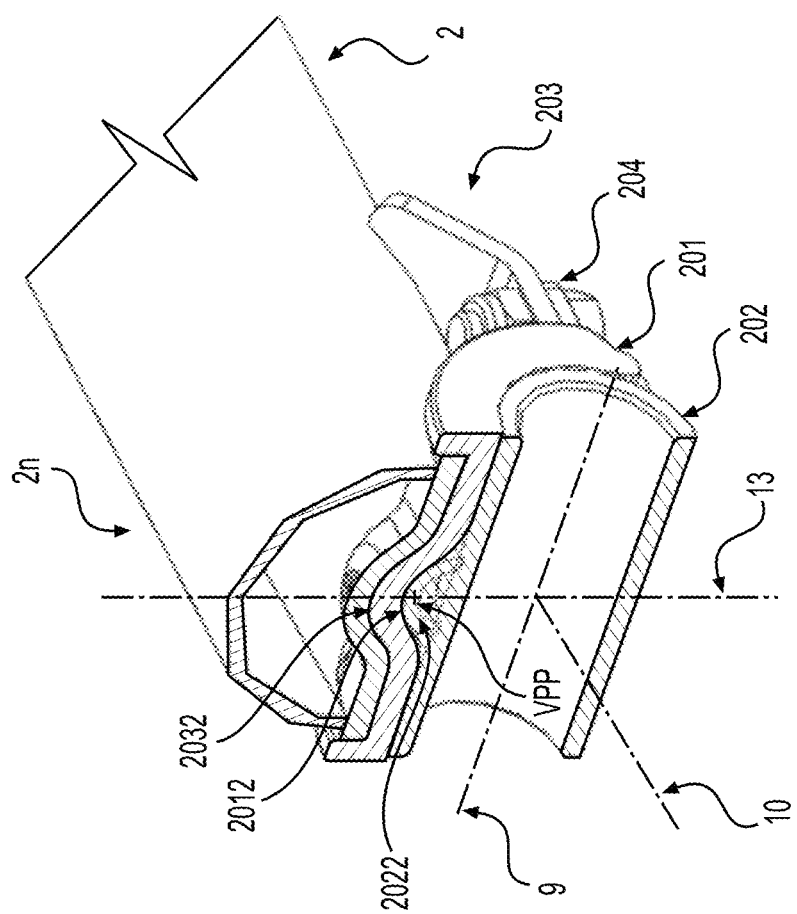
FIG. 12 is a perspective, cross-sectional view of a portion of the track system assembly of FIG. 1, showing a transversal cross-section view taken along cross-section line X-X of FIG. 4 without the tandem assembly and the internal components of the axle assembly.

In the present embodiment, the flange portion 2039 is configured to create a space between the base 203 and the frame 2, in order to mount the required fasteners (e.g. bolts and nuts) to connect the base 203 and the clamping members 204, as best seen in FIG. 12. Angle 2035 (FIG. 22) contributes to creating the space between the base 203 and the frame 2.

Resilient Body (First Embodiment)

Now referring to FIGS. 16 to 18, the first embodiment of the resilient body 201 has a generally cylindrical shape, with a generally hollow, open cross-section in order to receive the axle assembly 202 therein.

The external surface 2011 of the resilient body 201 is configured to be received in the concave portion 2031 of the base 203 and is generally complementary to the internal surface 2030 of the base 203.

The flanges 2014 of the resilient body 201 are protrusions extending radially outwardly away from the transverse axis 2016. The flanges 2014 position the resilient body 201 inside the base 203 and prevent relative translational movement along transverse axis 2016. It is understood that the flanges 2014 are also advantageously sealing a potential gap that could be formed between the base 203 and the resilient body 201, thus preventing debris, dirt and mud to enter the pivot assembly 200. In one embodiment, the resilient body 201 does not have the flanges 2014 and is generally cylindrical.

Figure 7:
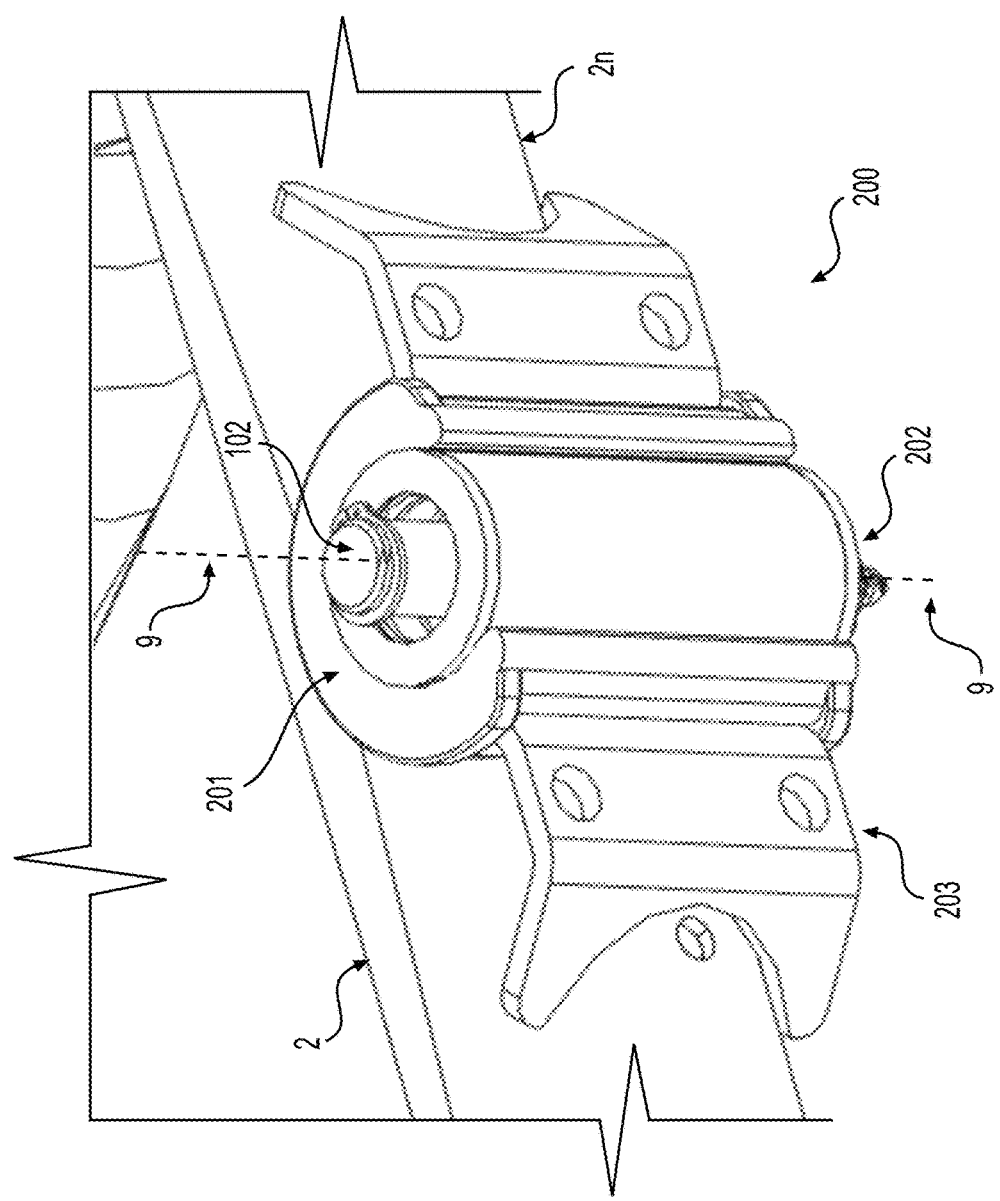
FIG. 7 is a perspective view taken from a bottom, front, left side of a portion of the pivot assembly of FIG. 6, with the second part (clamping members) omitted.
Figure 8:
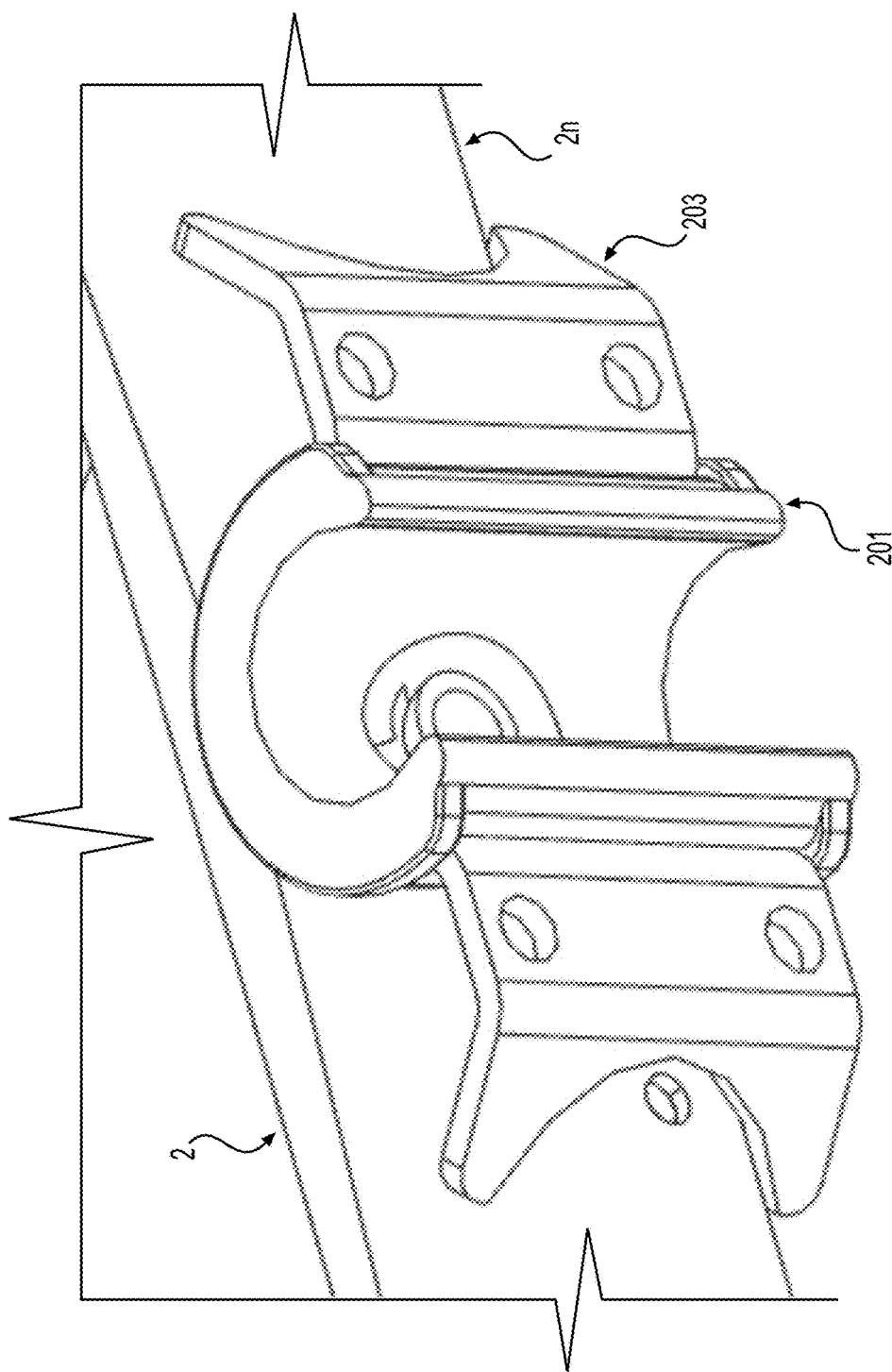
FIG. 8 is a perspective view taken from a bottom, front, left side of a portion of the pivot assembly of FIG. 6, with the second part (clamping members) and the axle assembly omitted.

In the present embodiment, the resilient body 201 defines an opening 2013 and is configured to wrap around at least a portion of the peripheral surface 2021 of the axle assembly 202, as shown in FIG. 7. The opening 2013 creates a generally cylindrical internal surface which extends toward a first direction generally parallel to the axis 2016 beyond flanges 2014 of the resilient body 201 and toward a second direction generally perpendicular (i.e. radially outwardly) to the axis 2016 beyond external surface 2011. The resulting overall shape of the resilient body 201 is similar to a horseshoe or "U-shaped" body.

Referring to FIG. 13, a wrap angle α of the resilient body 201 over the peripheral surface 2021 of the axle assembly 202 is less than 360 degrees, but greater than 180 degrees. In another embodiment, the wrap angle α could be less than 180 degrees. The resilient body 201 thus partially surrounds the axle assembly 202, and as will be described below, the axle assembly 202 can be withdrawn from the resilient body 201 by pulling it downwardly.

In the present embodiment, the resilient body 201 is made of a polymeric material, such as rubber. Other materials are contemplated.

Referring to FIGS. 16 to 18, the resilient member has an interlocking member 2012. The interlocking member 2012 is present in the opening 2013 in order to position the resilient body 201 with the other components of the pivot assembly 200 having a complementary interlocking member. In the present embodiment, the interlocking member 2012 is sized and configured to be received inside the concave portion 2031 of the base 203. The interlocking member 2012 is also sized and configured to receive and connect to an interlocking member 2022 protruding from the peripheral surface 2021 of the axle assembly 202. The interlocking member 2012 limits relative movement between the resilient body 201 and the base 203, and between the resilient body and the axle assembly 202 along and about axis 2016. In one embodiment, the interlocking member 2012 is a plurality of interlocking members 2012, disposed in the opening 2013 of the resilient body 201.

Figure 11:
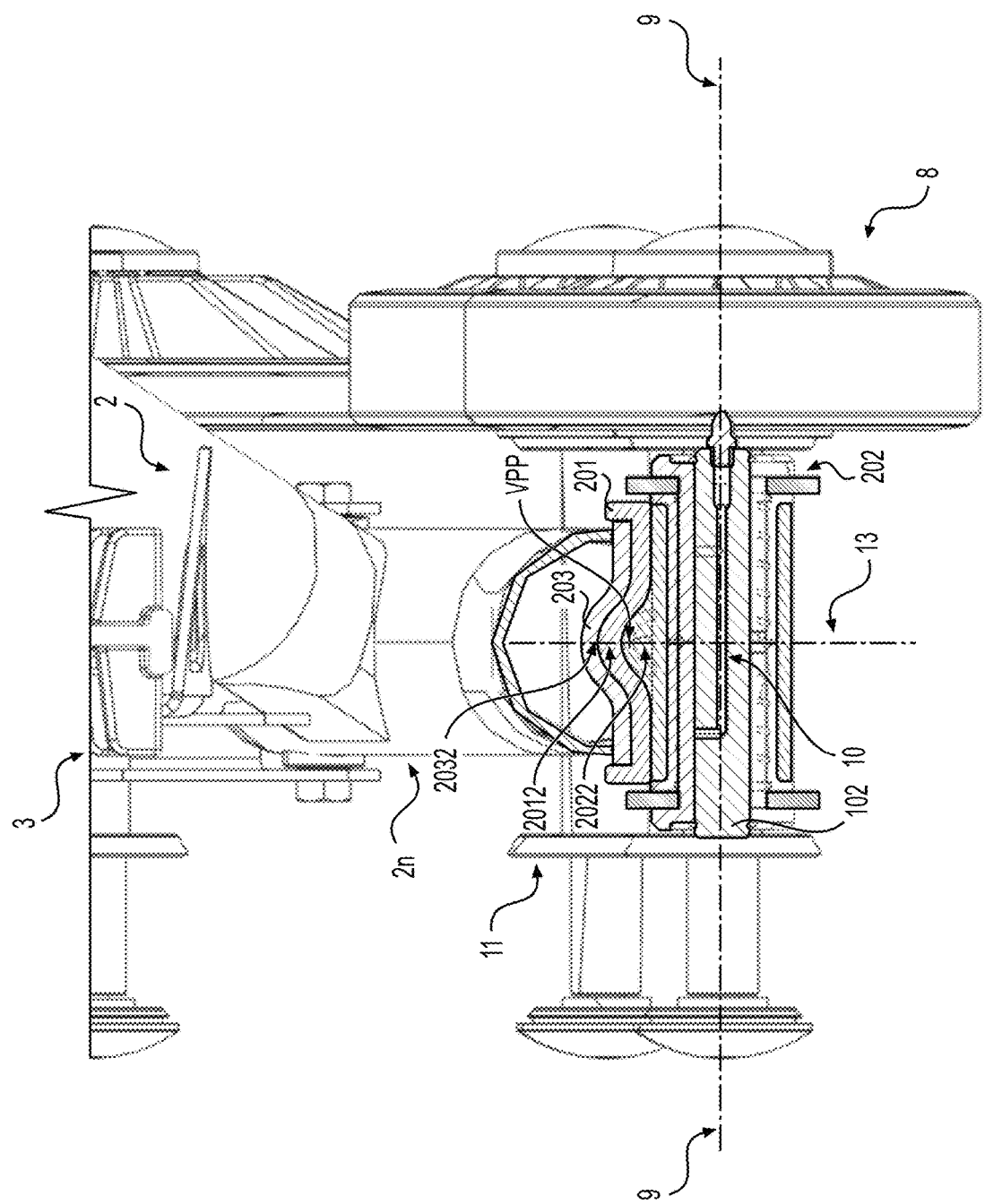
FIG. 11 is a cross-sectional view of a portion of the track system assembly of FIG. 1 taken along cross-section line X-X of FIG. 4.

In other words and referring to FIGS. 11 and 12, the interlocking member 2022 of the axle assembly 202 connects with the interlocking member 2012 of the resilient body 201, and the interlocking member 2012 of the resilient body 201 also connects with the interlocking member 2032 of the base 203.

Referring to FIG. 17, the interlocking member 2012 creates a negative geometry 2017 (i.e. concave/female geometry) generally protruding radially outwardly from the internal surface 2015 of the resilient body 201 that will match at least partially with the interlocking member 2022 of the axle assembly 202 having a generally complementary positive geometry (i.e. convex/male geometry) protruding radially outwardly from the peripheral surface 2021 of the axle assembly 202, and the interlocking member 2012 matches with the interlocking feature 2032 of the base 203 having a generally complementary negative geometry (i.e. concave/female geometry) protruding radially inwardly from the internal surface 2030 of the base 203.

In another embodiment, the interlocking member 2012 creates a positive geometry (i.e. convex/male geometry) generally protruding radially inwardly from the internal surface 2015 of the resilient body 201 that will match at least partially with the interlocking member 2022 of the axle assembly 202 having a generally complementary negative geometry (i.e. concave/female geometry) protruding radially inwardly from the peripheral surface 2021 of the axle assembly 202, and the interlocking member 2012 matches at least partially with the interlocking feature 2032 having a generally complementary positive geometry (i.e. convex/male geometry) protruding radially inwardly from the internal surface 2030 of the base 203.

In another embodiment, the interlocking member 2012 is a hole or a cutout defined in the internal surface 2015 that creates a negative geometry (i.e. concave/female geometry) that will match at least partially with the interlocking member 2022 of the axle assembly 202 having a generally complementary positive geometry (i.e. convex/male geometry) protruding radially outwardly from the peripheral surface 2021 of the axle assembly 202, and the interlocking member 2012 matches at least partially with the interlocking feature 2032 of the base 203 having a generally complementary positive geometry (i.e. convex/male geometry) generally protruding radially inwardly from the concave portion 2031 of the base 203.

Virtual Pivot Point

The interlocking members 2012, 2022, 2032 locally modify the cross-sections of their respective component. Since the pivot assembly 200 is movable upon deformation of the resilient body 201, having the interlocking member 2012 as provided in the present embodiment defines a virtual pivot point VPP about which the axle assembly 202 can pivot. The virtual pivot point VPP is located at the centroid of combined sections of the base 203, the axle assembly 202 and the resilient body 201 in the vertical direction (FIGS. 11-13). It is to be noted that the virtual pivot point is spaced from the transverse axis 9 and longitudinal axis 10.

Having the virtual pivot point VPP spaced from the transverse axis 9 and the longitudinal axis 10 concentrates the movements and the forces applied to the axle assembly 202 to a single central point, which is where there is less relative displacement between parts constituting the pivot assembly 200. In other words, the virtual pivot point VPP is where there is virtually no load nor shear stress, in a similar fashion to a neutral axis of a beam in bending condition. In addition, such a construction of the pivot assembly 200 limits tensile forces induced in the resilient body 201 which is made of elastomeric material performing best in compression and not in tension. Another advantage of not having the resilient body 201 in tension is the fact that even if mud or debris were to infiltrate between parts of the pivot assembly 200, it would not affect performance nor the reliability of the pivot assembly 200 because the virtual pivot point VPP is "protected" by being in the middle of the pivot assembly 200 and inside "material matter".

In other words, the shape and configuration of the interlocking members 2012, 2022, 2032 are selected to provide that the axle assembly 202 pivots about the virtual pivot point VPP that is spaced from the transverse axis 9 and longitudinal axis 10, causing the resilient body 201 to remain in compression throughout the range of motion of the axle assembly 202 permitted by the resilient body 201. Durability of the resilient body 201 is thus increased compared to other technologies where a resilient bushing can be subjected to both compression and tension forces when in use. In addition, having the interlocking members 2012, 2022, 2032 connected together limits relative displacement (such as sliding) of the base 203, the resilient body 201 and the axle assembly 202 with one another.

Figure 27:
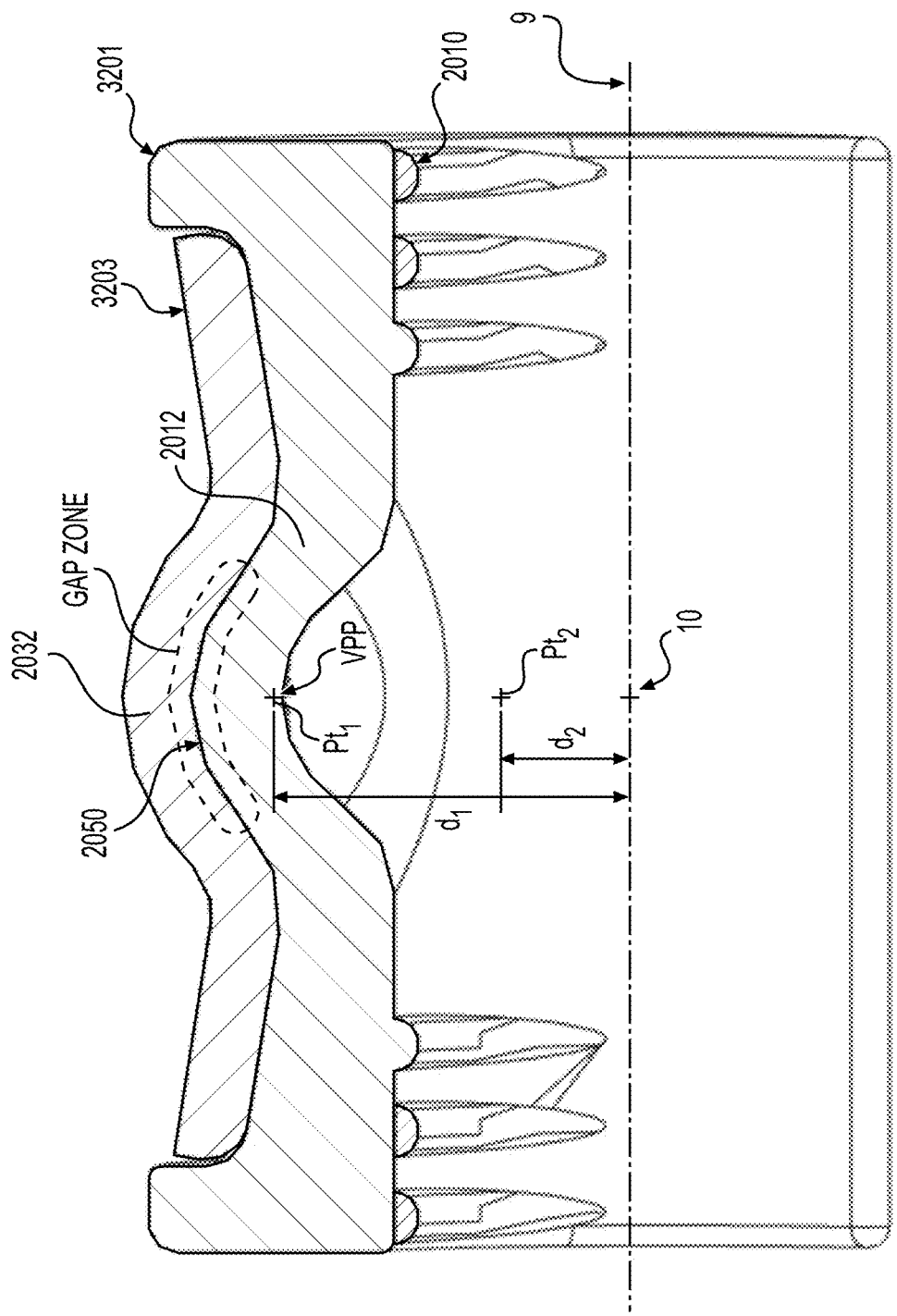
FIG. 27 is a transversal cross-sectional view of the first part (base) and the resilient body of the pivot assembly of FIG. 25.
Figure 28:
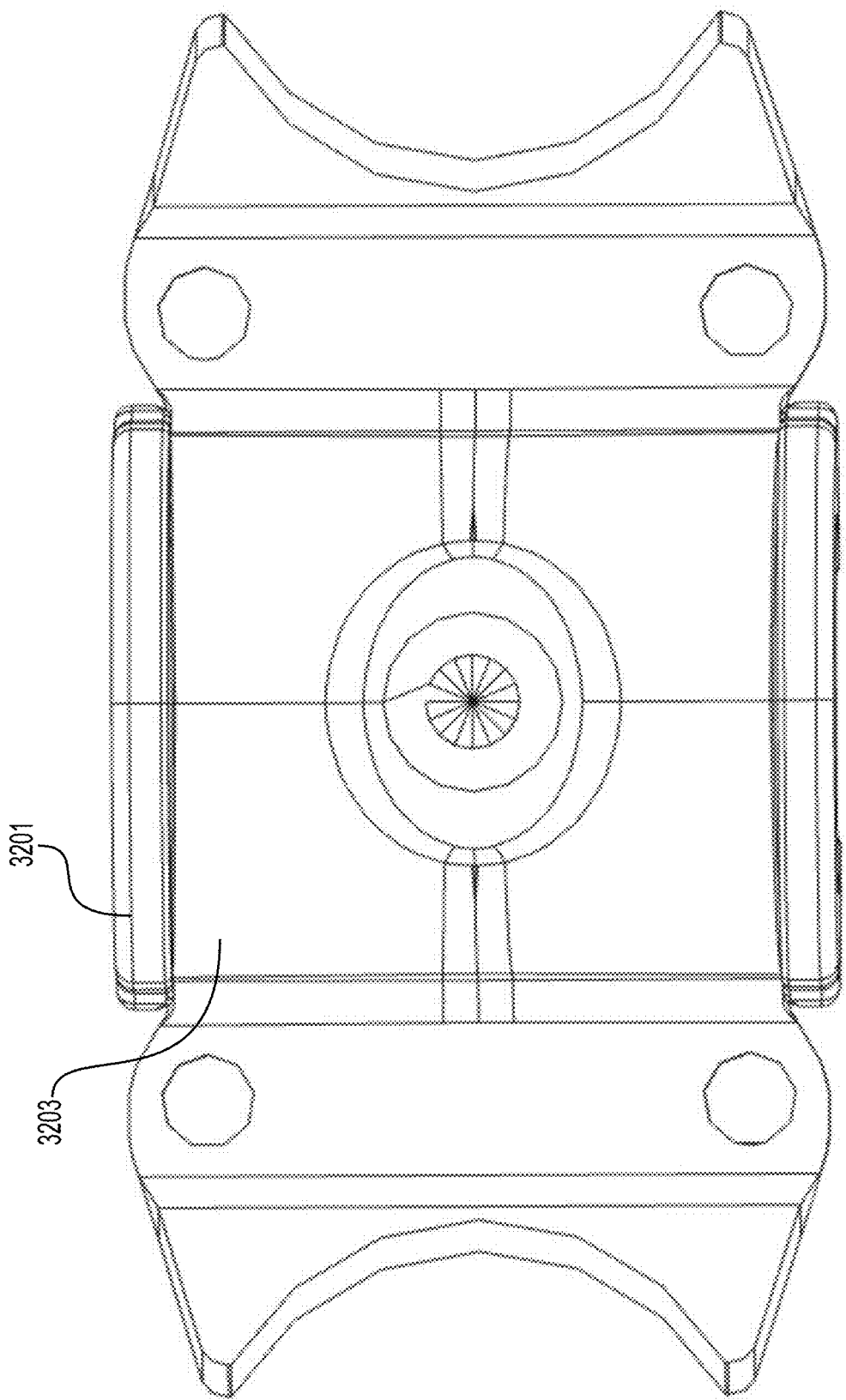
FIG. 28 is a top plan view of the first part (base) and the resilient body of the pivot assembly of FIG. 25.
Figure 29:
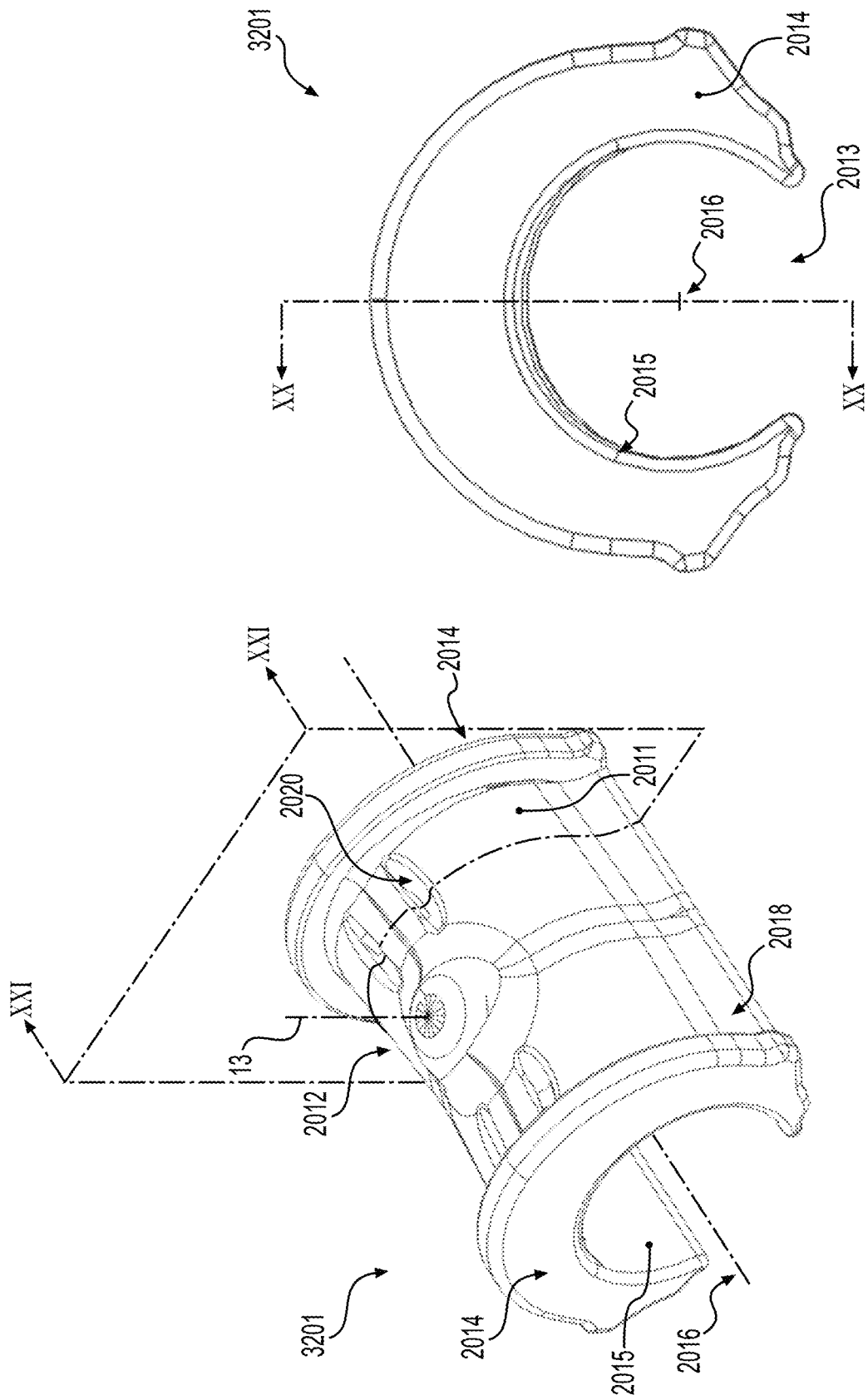
FIG. 29A is a perspective view taken from a top, rear, left side of the resilient body of the pivot assembly of FIG. 25.
FIG. 29B is a left side elevation view of the resilient body of the pivot assembly of FIG. 25.

In some embodiments, at least one of the interlocking member 2012 and the interlocking member 2032 is configured to provide a predetermined spacing 2050 therebetween, the spacing 2050 being located within the defined "Gap Zone" in FIG. 27. It is to be understood that when both interlocking members 2032 and 2012 are completely complementary (i.e. configured to completely be in contact with each other), the spacing 2050 is null, and the resulting virtual pivot point VPP of the axle assembly 202 about longitudinal axis 10 (FIG. 27) (via deformation of resilient body 201) is approximately located at Pt1 which is vertically spaced at distance d1 from the longitudinal axis 10, which is relatively close to the interlocking members 2012, 2032.

It has been observed that having such a virtual pivot point VPP of the axle assembly 202 approximately located at Pt1 may cause a "peeling effect" of the resilient body 201 from the base 203 or the axle assembly 202, which might allow debris, water, etc. to enter between separated parts and therefore cause deterioration of the pivot assembly 200. In contrast, when a spacing 2050 is provided between the interlocking member 2032 of the base 203 and the interlocking member 2012 of the resilient body 201, the virtual pivot point VPP of the axle assembly 202 is located approximately at Pt2 at distance d2, which is closer to the longitudinal axis 10 compared to d1. This decreases the "peeling effect" of the resilient body 201 from the base 203 or the axle assembly 202, among other things.

It is to be understood that having an interlocking member 2012 of the resilient body 201 being a hole or a cut-out has a similar effect of having the spacing 2050 between the interlocking member 2032 of base 203 and the interlocking member 2012 of the resilient body 201.

It is also to be understood that portions located on both sides of the "Gap Zone" shown in FIG. 27 maintain the interlocking relationship of resilient body 201 and the base 203.

In another embodiment, the resilient body 201 does not have an interlocking member 2012, and the opening has a cross-section that is generally uniform.

Referring back to FIGS. 16 to 18, the interlocking member 2012 has a generally hemispherical shape and is a local and secluded boss (or bulged portion) of the internal surface 2015 and/or external surface 2011 of the resilient body 201, in such a way that the interlocking member 2012 locally modifies the cross-section of the resilient body 201. In other words, the cross-section of the resilient body 201 is generally constant, except near the interlocking member 2012.

In other embodiments, the interlocking member 2012 could have a different shape, e.g. prismatic, oval, oblong, square, polygonal, etc.

In the present embodiment, a bulged portion 2018 extends from each one of the edges 2019 defining the opening 2013 in order to provide a good sitting of the resilient body 201 between the base 203 and the clamping members 204, as best seen in FIG. 13. The bulged portion 2018 also contribute to limit rotational movement of the resilient body 201 about the axis 2016. In one embodiment, the bulged portions 2018 and the flanges 2014 are also acting as interlocking members.

Axle Assembly

Figure 14:
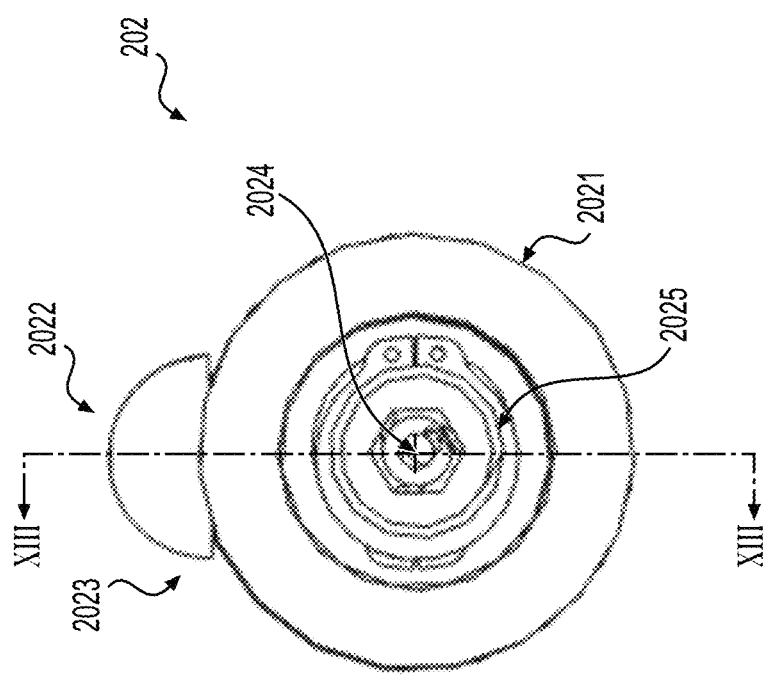
FIG. 14 is a left side elevation view of the axle assembly of the track system assembly of FIG. 1.
Figure 15:
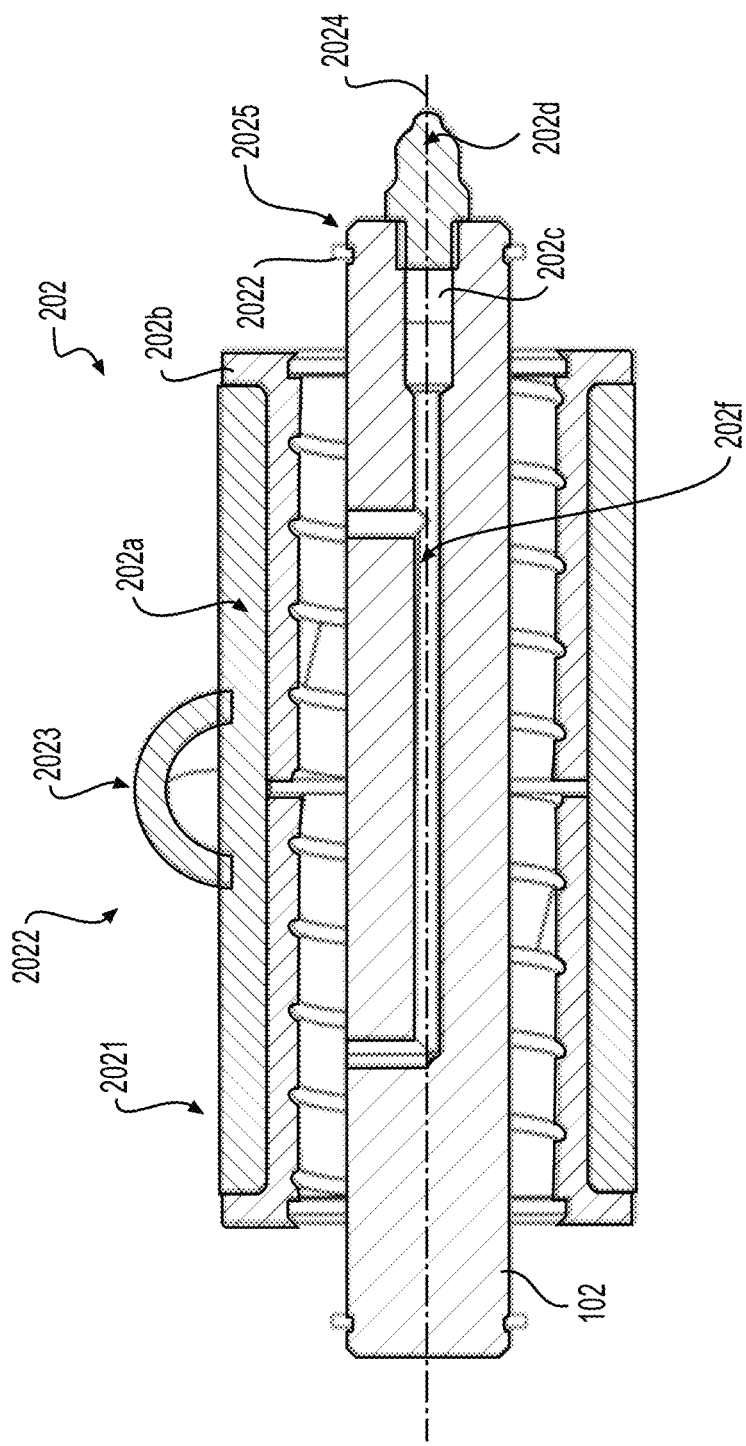
FIG. 15 is a normal cross-sectional view of a portion of the axle assembly of FIG. 4, taken along a cross-section line XII-XII of FIG. 14 of some of the internal components of the axle assembly.

As shown in FIGS. 14 and 15, the axle assembly 202 is an assembly of multiple parts, including the axle 102, an outer shell 202a, a bushing 202b, an inner greater part 202c having a port 202d, a retaining ring 202e, and a grease canal 202f, at least one flanged hollow shaft 202g received by the bushing 202b and receiving the inner greater part 202c, and a dust cap (not shown), that allows the tandem assembly 12 to pivot about transverse axis 9.

In one embodiment, the axle assembly 202 includes an axle of a ground-contacting wheel assembly 300, i.e. the ground-contacting wheel assembly 300 is directly mounted to the pivot assembly 200 without tandem assembly 12.

The axle assembly 202 is configured to be received in the other components of the pivot assembly 200, including the base 203, the resilient body 201 and the clamping members 204, as best seen in FIG. 6.

The axle assembly 202 is configured to receive the other components of the tandem assemblies 12, including support plates 11 (FIGS. 5 and 6). As shown in FIG. 10, the support plate 11 of the tandem assembly 12 is typically installed on the flanged hollow shaft 202g, between the flange of a bushing 202b and the flange of a flanged hollow shaft 202g. Other configurations are possible to connect the tandem assemblies 12 to the axle assembly 202.

The generally cylindrical peripheral surface 2021 of the axle assembly 202 is configured to be at least partially wrapped around by the resilient body 201. In one embodiment, a surface treatment is performed on the peripheral surface 2021 to improve interface with the resilient body 201.

As described above, the interlocking member 2022 is present on the peripheral surface 2021 of the axle assembly 202 to position the axle assembly 202 inside the opening 2013 of the resilient body 201 and to limit relative movement between the axle assembly 202 and the resilient body 201 along and about axis 2024. The interlocking member 2022 has an outer surface 2023 that is complementary to the inner surface of the resilient body 201 forming the interlocking member 2012. In one embodiment, the interlocking member 2022 is a plurality of interlocking members 2022, disposed on the peripheral surface 2031 of the axle assembly 202.

In the present embodiment, the interlocking member 2022 creates a positive geometry 2017 (i.e. convex/male geometry) generally protruding radially outwardly from the peripheral surface 2021 of the axle assembly 202 that will match at least partially with a generally complementary negative geometry (i.e. concave/female geometry) protruding radially outwardly from the opening 2013 of the resilient body 201.

In another embodiment, the interlocking member 2022 creates a negative geometry (i.e. concave/female geometry) generally protruding radially inwardly from the peripheral surface 2021 of the axle assembly 202 that will match at least partially with a generally complementary positive geometry (i.e. convex/male geometry) protruding radially inwardly from the opening 2013 of the resilient body 201.

In one embodiment, the interlocking member 2022 is a hole or a cut-out in the peripheral surface 2021 of the axle assembly 202, which creates a negative geometry (i.e. concave/female geometry) that will match at least partially with a generally complementary positive geometry (i.e. convex/male geometry) protruding radially inwardly from the opening 2013 of the resilient body 201.

In one embodiment, the axle assembly 202 does not have an interlocking member 2022.

In the present embodiment, the interlocking member 2022 has a generally hemispherical shape and is a local and secluded boss (or bulge) of the peripheral surface 2021 of the axle assembly 202, in such a way that the interlocking member 2022 locally modifies the cross-section of the axle assembly 202. In other embodiments, the interlocking member 2022 could have a different shape, e.g. prismatic, oval, oblong, square, polygonal, etc.

In the present embodiment, the interlocking member 2022 is a generally hemispherical boss that is welded on the peripheral surface 2021 of the axle assembly 202. In one embodiment, the interlocking member 2022 is connected to the peripheral surface 2021 of the axle assembly 202 using other techniques, such as fastening, bonding, overmolding, crimping, snapping, etc. In one embodiment, the interlocking member 2022 may be part of the peripheral surface 2021 of the axle assembly 202 (e.g. forged, molded, 3D printed, machined, etc.).

In the present embodiment, the cross-section of the axle assembly 202 is generally constant, except for a portion near the interlocking member 2022.

Clamping Members

Figure 19:
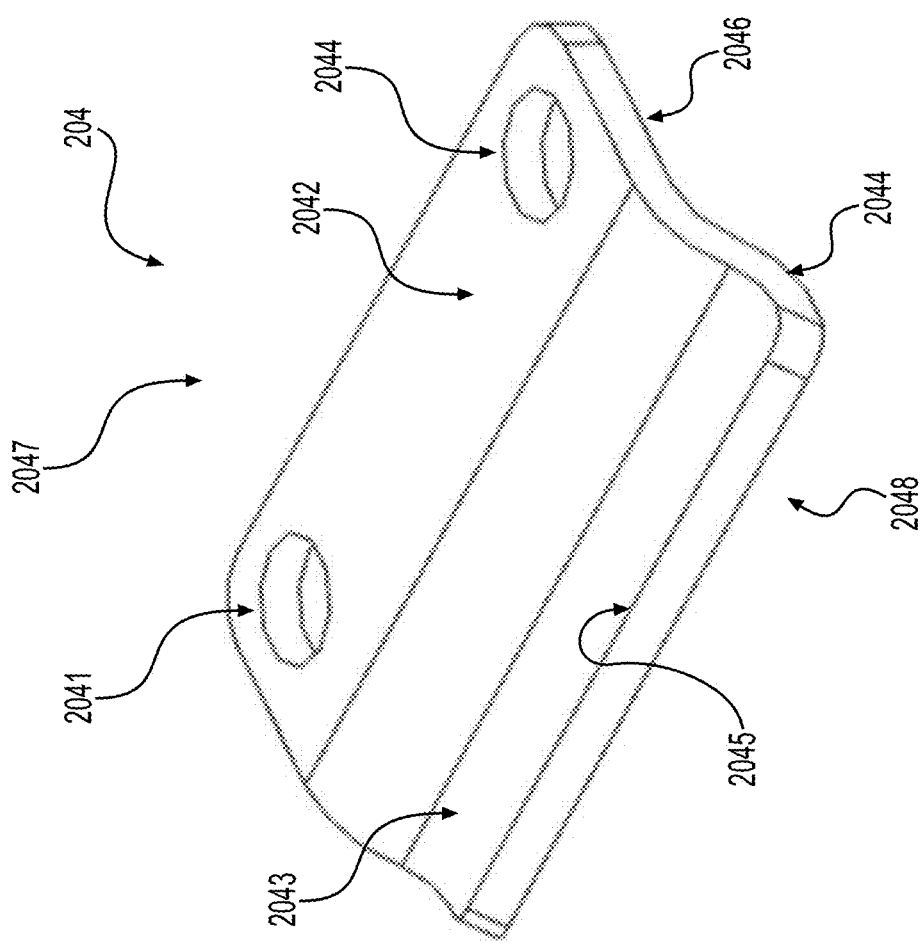
FIG. 19 is a side elevation view of a second part (clamping member) of the track system assembly of FIG. 1.

The clamping members 204 of the pivot assembly 200 are configured to be removably connected (e.g. fastened, clamped, etc.) to the base 203 as shown in FIGS. 6 and 13. In the present embodiment, connection of the clamping members 204 with the base 203 is made using interface portion 2041 (FIG. 19). It is to be understood that other configurations and geometries to meet the coupling purpose are considered to be covered by the present technology.

In the present embodiment, the base 203 is configured to receive the clamping members 204 via an interface portion 2034 as shown in FIGS. 6, 13 and 20 for illustrative purposes.

In one embodiment, the clamping members 204 are configured to be received by an interface portion provided on the frame 2.

As best seen in FIG. 6, the clamping members 204 are configured to be connected to the base 203 and to wrap other components of pivot assembly 200, including at least a lower portion of the resilient body 201. In one embodiment, a portion of the peripheral surface 2021 of the axle assembly 202 is also wrapped by the clamping members 204.

In the present embodiment, the projecting lines tangent φ are converging as shown in FIG. 13. In one embodiment, the projecting lines tangent φ are diverging.

In the present embodiment, the clamping members 204 partially encloses the resilient body 201 to minimize packaging volume of the pivot assembly 200, among other things. It is understood that other configurations and geometries are considered to be covered by the present technology.

In the present embodiment, the clamping members 204 do not apply significant clamping force on the resilient body 201, resulting in an insignificant preload in the resilient body 201. In another embodiment, the clamping members 204 are configured to apply a predetermined clamping force to the resilient body 201, resulting in a significant preload in the resilient body 201.

In the present embodiment, the clamping members 204 are two independent parts to minimize packaging volume of the pivot assembly 200, among other things. In one embodiment, the clamping members 204 could be replaced by a single clamping member extending forward and rearward of the axle assembly 202.

In the present embodiment, the clamping members 204 are generally made of metallic material, such as steel. In other embodiments, the clamping members 204 may be made of other metallic material e.g. aluminum, etc. but may also be made of non-metallic materials e.g. plastic, fibre reinforced resin, etc., or a combination of multiple metallic and non-metallic materials, as known in the art.

In the present embodiment and referring to FIG. 19, the clamping members 204 have an upper portion 2047 and a lower portion 2048, which extend generally parallel to one another, and are vertically offset.

The upper portion 2047 comprises the interface portion 2041 that is configured to match with the interface portion 2034 of the base 203 and is generally complementary to the internal surface 2030 of the base 203 for coupling purposes.

In the present embodiment, the interface portion 2041 comprises through holes to receive bolts, but other coupling configurations are possible (e.g. snap, mechanical interlock, threaded holes, inserts, etc.).

The lower portion 2048 has a generally curved shape to match the shape of flanges 2018 of the resilient body 201 and to hold the resilient body 201 in place within the base 203. More precisely, the lower portion 2048 has a curved shape comprising an internal radius defining a clamp recess 2043 generally complementary to the bulged portion 2018, as best seen in FIG. 13. In the present embodiment, the clamp recess 2043 ends with a tangent pointing upwardly to create a "claw-like" shape (seen in FIG. 13) maintaining the resilient body 201 in place relative to the base 203. Different configurations and geometries are possible in order to meet same function and are considered to be covered by present technology.

A transition portion 2049 joins the upper portion 2047 and the lower portion 2048. Transition portion 2049 can be curved or straight, depending of the design of other components of the pivot assembly 200 it is mating with. For instance, a curved shape avoids having the resilient body 201 being pinched between the base 203 and the clamping members 204, as shown in FIG. 13.

Pivot Assembly (Second Embodiment)

Referring now to FIGS. 25 to 34, a second embodiment of the pivot assembly 3200 is illustrated. The same numeral references have been used to identify equivalent components from the first embodiment, but with a digit 3 added thereto as a prefix. Only differences between the first and the second embodiments will be described for clarity purposes.

In the second embodiment, the base 3203 and the resilient body 3201 differ from the base 203 and the resilient body 201 described in the first embodiment.

Base (Second Embodiment)

Figure 33:
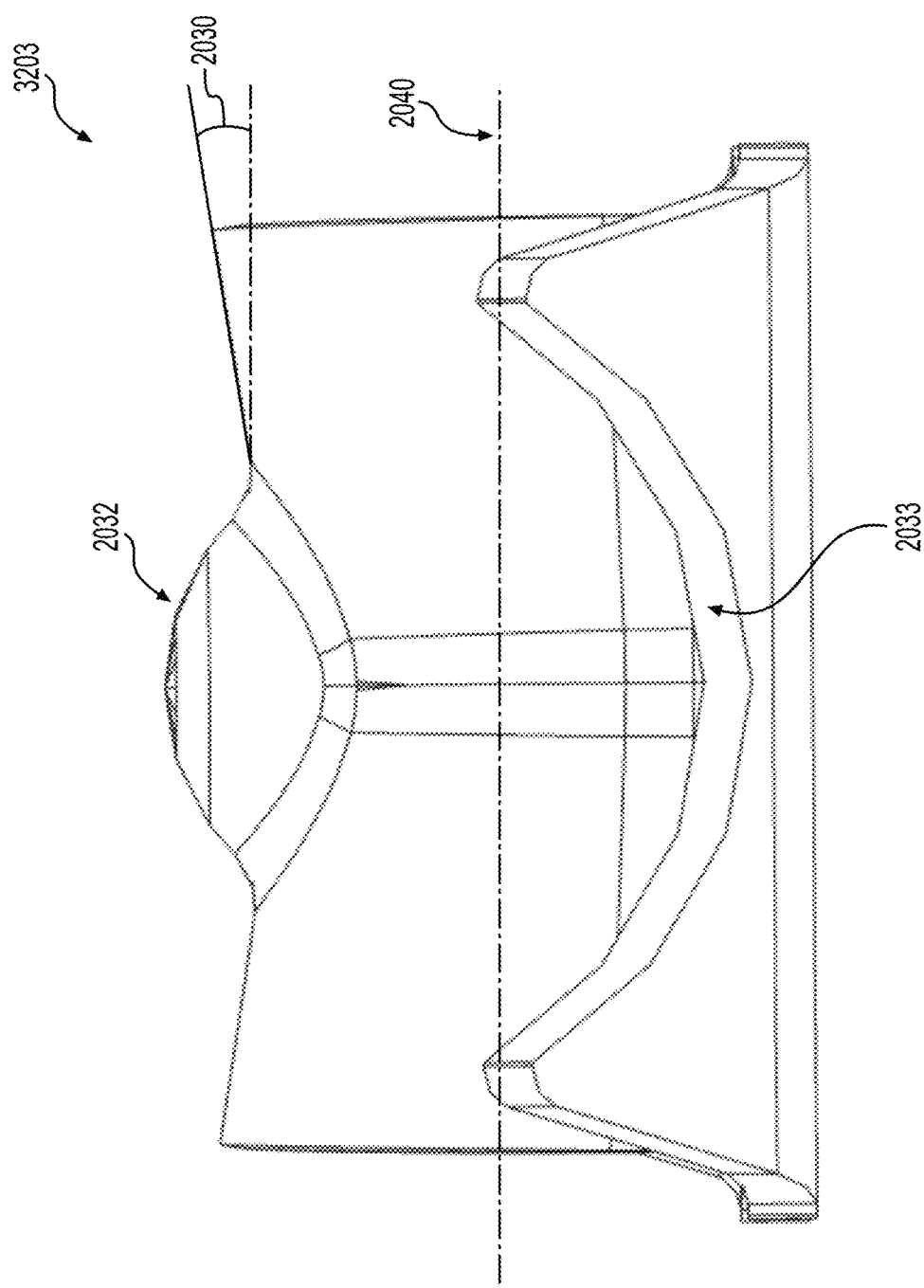
FIG. 33 is a front view of the first part (base) of FIG. 32.
Figure 34:
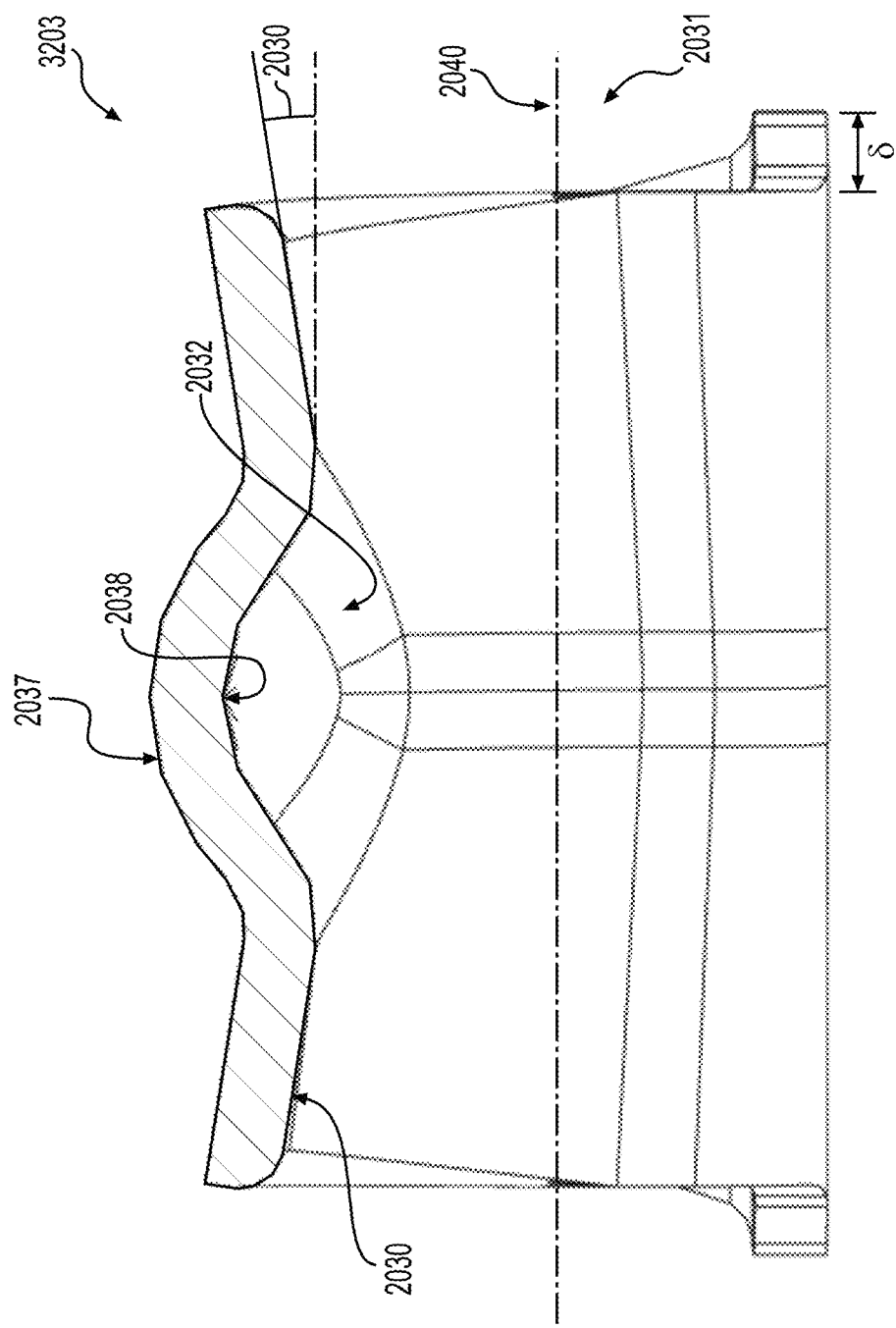
FIG. 34 is a transversal cross-sectional view of the first part (base) of FIG. 32.

As shown in FIG. 33, in the second embodiment, the base 3203 has a generally cylindrical shape wherein the cross-section is not constant, in that the cylindrical shape of the upper portion of the base 3203 flares outwardly from a longitudinal centre plane 3300. The top portion of the base 203 has a generally concave shape, e.g. configured as a "V-shape" of angle 2030, in order to allow a greater rotational range of motion of the axle assembly 202 about longitudinal axis 10. For example, the "V-shape" geometry of the present embodiment allows a rotational range of motion of the tandem assembly 12 about the longitudinal axis 10 (i.e. roll motion or lateral bending) allowed by the deformation of the resilient body 3201 of about +8 degrees in one direction (e.g. clockwise) and about −8 degrees in the other direction (e.g. counterclockwise). It is understood that other configurations may be considered to obtain greater or smaller rotational range of motion about longitudinal axis 10.

The interface portion 2034 extends beyond the concave portion 2031 of a distance δ (FIG. 34) in order to increase space between the frame 2 and base 3203 for fasteners used to connect the clamping members 204 to the base 3203.

Resilient Body (Second Embodiment)

Now referring to FIGS. 29A to 31, a second embodiment of the resilient body 3201 is illustrated. As in the first embodiment, the resilient body 3201 has a generally cylindrical shape, with a generally hollow, open cross-section in order to receive the axle assembly 202.

The external surface 2011 of the resilient body 3201 is configured to be received in the concave portion 2031 of the base 3203 and is generally complementary to the internal surface 2030 of the base 3203, which, as described above, may be non-constant. In this embodiment, angle 201A (FIG. 30) of the resilient body 3201 matches with angle 2030 of the base 3203. In other words and referring to FIG. 30, the cross-section of the resilient body 3201 has a "V-shape" in that the outer portions flare outwardly from the longitudinal centre plane 3300.

Figure 30:
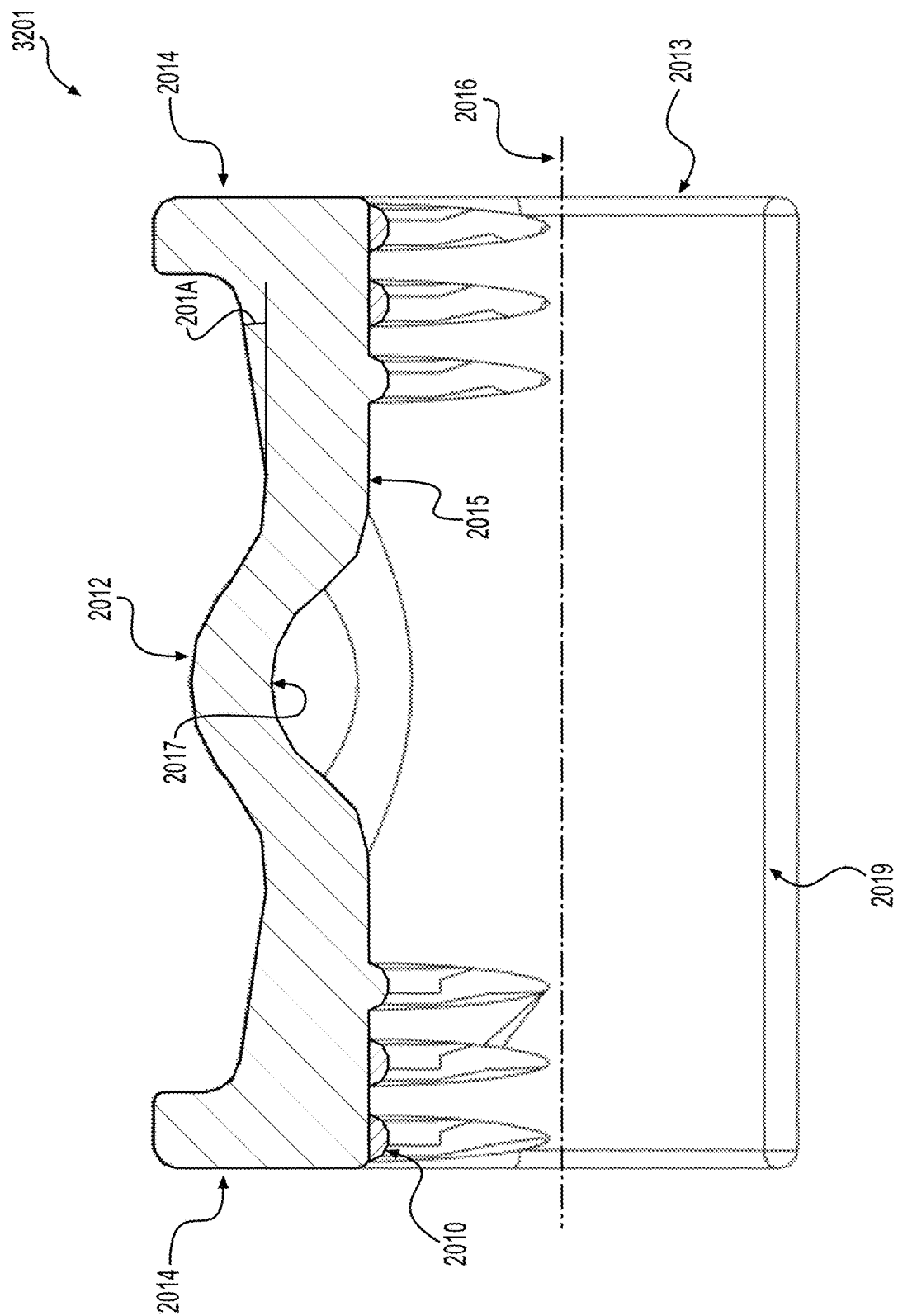
FIG. 30 is a cross-sectional view of the resilient body of the pivot assembly of FIG. 25 taken along cross-section line XX-XX of FIG. 29B.

As shown in FIG. 30, the resilient body 3201 has protrusions 2010 extending radially inwardly from internal surface 2015 of the opening 2013 that are configured to seal the interface between axle assembly 202 and the resilient body 3201. The protrusions 2010 are interfering with the external surface 2021 of axle assembly 202 in order to provide for an effective sealing against debris, water, etc. when the axle assembly 202 is pressed against the resilient body 3201. Other sealing means could be used, such as replacing the protrusions 2010 by protrusions on the external surface 2021 of the axle assembly 202, or adding independent seal (e.g. o-ring) for instance to accomplish a similar sealing function.

Figure 31:
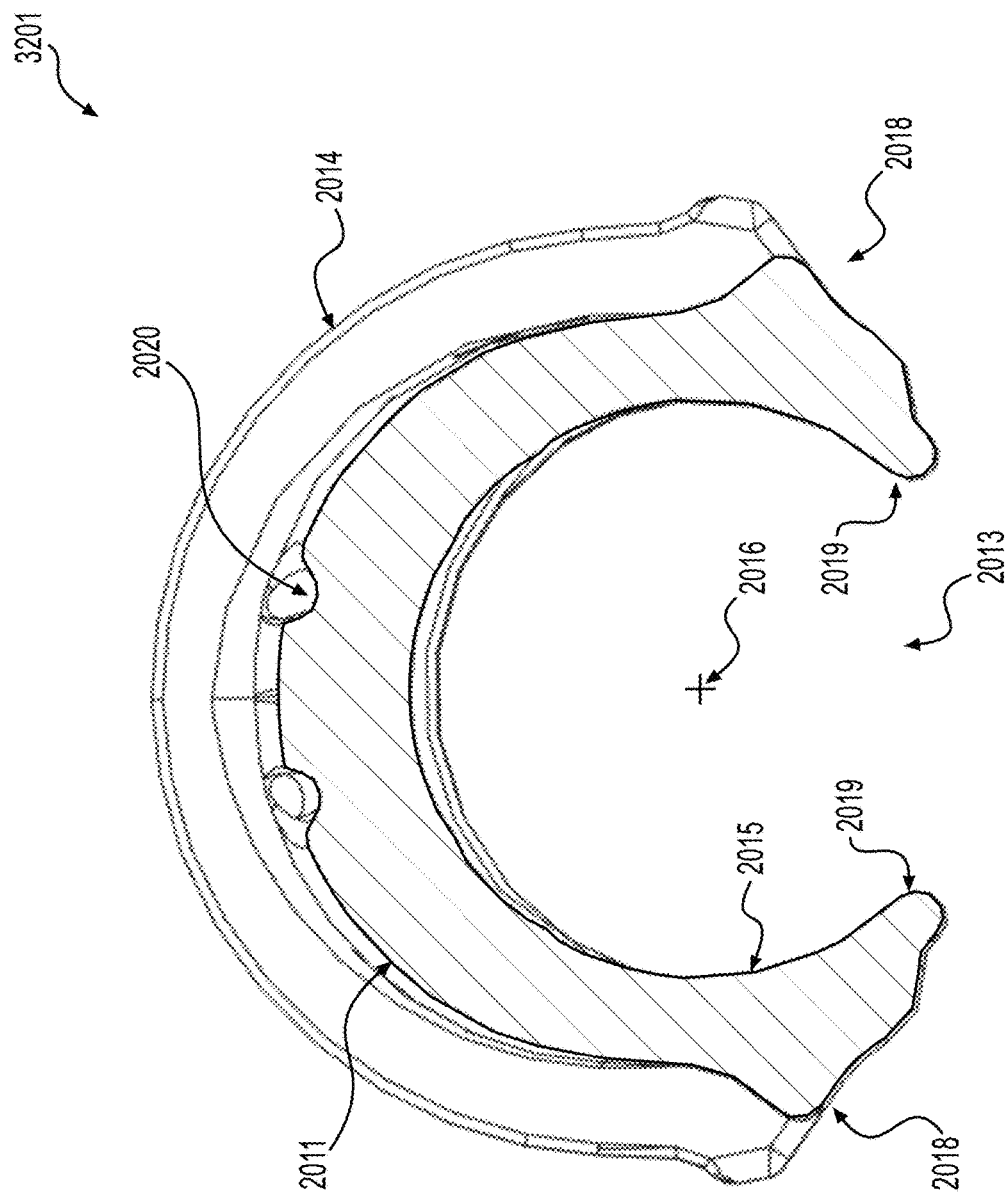
FIG. 31 is a cross-sectional view of the resilient body of the pivot assembly of FIG. 25 taken along cross-section line XXI-XXI of FIG. 29A.
Figure 32:
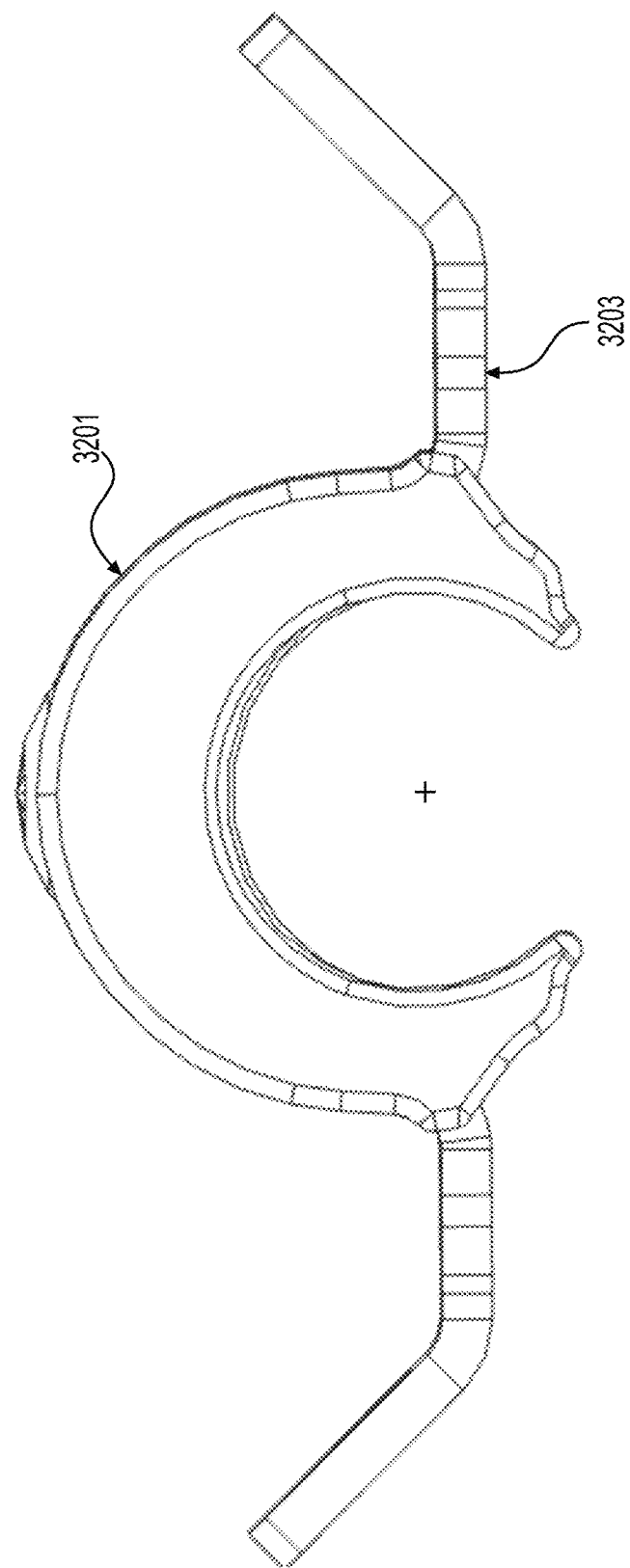
FIG. 32 is a left side elevation view of the first part (base) and the resilient body of the pivot assembly of FIG. 25.

As shown in FIGS. 29A and 31, the resilient body 3201 has cavities 2020 defined on external surface 2011 thereof to allow resilient material of the resilient body 3201 to expand locally when deformed under load. Different configurations or geometries of such cavities 2020 could be used, such as a peripheral groove for instance. In one embodiment, the resilient body 3201 does not have cavities 2020.

Method for Performing Replacement of a Ground-Contacting Wheel Assembly Connected to a Frame of a Track System Assembly Via the Pivot Assembly As mentioned above, one of the advantages of using the above-described pivot assembly 200 for connecting a ground-contacting wheel assembly 300 to the frame 2 is its convenient installation/removal, which is especially useful during maintenance activity.

For instance, when it is determined that a ground-contacting wheel assembly 300 requires to be replaced, it is easy to perform such replacement thanks to the pivot assembly 200, because it is possible to access the ground-contacting wheel assembly 300 from one side (i.e. from underneath the track system assembly 1) thanks to the pivot assembly 200 having some of its components with an open cross-section, which permits convenient disassembly of the ground-contacting wheel assembly 300.

In accordance with another aspect of the present technology, there is provided a method for performing replacement of a ground-contacting wheel assembly 300 mounted to the frame 2 using a pivot assembly 200, the method consisting of following steps:

1) Lowering tension in the resilient track 4 by loosening or deactivating the tensioner 7;
2) Removing the resilient track 4 from the track system assembly 1;
3) Disconnecting the clamping members 204 of the pivot assembly 200 from the base 203 of the pivot assembly 200;
4) Removing the ground-contacting wheel assembly 300 from the pivot assembly 200 by pulling the ground-contacting wheel assembly 300 downwardly. At this point, the ground-contacting wheel assembly 300 is released as an assembly from the pivot assembly 200;
5) Withdrawing the resilient body 201 from the axle assembly 202;
6) Installing the resilient body 201 on the axle assembly 202 of a new ground-contacting wheel assembly 300. When applicable, positioning the resilient body 201 on the axle assembly 202 by connecting respective interlocking members 2012 and 2022;
7) Inserting the resilient body 201 and the new ground-contacting wheel assembly 300 inside the concave portion 2031 of the base 203. When applicable, positioning the resilient body 201 in the base 203 by connecting respective interlocking members 2012 and 2032;
8) Reconnecting the clamping members 204 with the base 203;
9) Reinstalling the resilient track 4 on the track system assembly 1; and
10) Reapplying predetermined tension to the resilient track 4 using or activating the tensioner 7.

It is to be understood that the ground-contacting wheel assembly 300 in question may be configured as a tandem assembly 12 or as a simple wheel assembly comprising at least one wheel 101 and an axle 102.

Is it to be understood that a person skilled in the art will figure out the details and specifics implied in the overall method and its steps, which we believe are part of common general knowledge.

Method for Performing Replacement of a Component of the Pivot Assembly

When it is determined that a component of the pivot assembly 200 requires to be replaced—such as the resilient body 201 for example—this task is facilitated by the possibility of disassembling the pivot assembly 200 from the frame 2 without disassembling the ground-contacting wheel assembly 300 mounted on the pivot assembly 200, based on the fact that required access is from one side (i.e. from underneath the track system assembly 1) and on the fact that its components have open cross-section.

A method is provided to perform replacement of a component of the pivot assembly 200, such as the resilient body 201, the method comprising the following steps:

1) Lowering tension in the resilient track 4 by loosening or deactivating the tensioner 7;
2) Removing the resilient track 4 from the track system assembly 1;
3) Disconnecting the clamping members 204 of the pivot assembly 200 from the base 203 of the pivot assembly 200;
4) Removing the ground-contacting wheel assembly 300 from the pivot assembly 200. At this point, the ground-contacting wheel assembly 300 is released as an assembly from the pivot assembly 200;
5) Removing the worn-out resilient body 201;
6) Installing a new resilient body 201 on the axle assembly 202 of the ground-contacting wheel assembly 300.

When applicable, positioning the resilient body 201 on the axle assembly 202 by connecting the respective interlocking members 2012 and 2022;

7) Inserting the new resilient body 201 and the ground-contacting wheel assembly 300 inside the concave portion 2031 of the base 203. When applicable, positioning the resilient body 201 in the base 203 by connecting the respective interlocking members 2012 and 2032;

8) Reconnecting the clamping members 204 with the base 203;

9) Reinstalling the resilient track 4 in the track system assembly 1; and

10) Reapplying predetermined tension to the resilient track 4 using or activating the tensioner 7.

It is to be understood that the same procedure can be followed to replace any other components of the pivot assembly 200.

It is to be understood that the ground-contacting wheel assembly 300 in question may be configured as a tandem assembly 12 or as a simple wheel assembly comprising at least one wheel 101 and an axle 102.

Is it to be understood that a person skilled in the art will figure out the details and specifics implied in the overall method and its steps, which we believe are part of common general knowledge.

It is to be understood that the ground-contacting wheel assembly 300 has not been dismantled in none of the methods disclosed here above, thanks to the fact that components of the pivot assembly 200, e.g. clamping members 204, the resilient body 201, and the base 203 have openings and wrap angles that permit easy installation/removal of the ground-contacting wheel assembly 300 in its full assembled configuration. No need neither to disassemble a wheel 101 of the at least one wheel 101 nor an axle 102 from the ground-contacting wheel assembly 300 in order to replace components of the pivot assembly 200 it is mounted on.

It is believed that these methods are advantageous especially for users that want to minimize down-times required for maintenance (e.g. replacing a ground-contacting wheel assembly 300 or a component of a pivot assembly 200).

Additionally, it is to be understood that since the ground-contacting wheel assemblies 300 that are using a pivot assembly 200 do not require to be disassembled for maintenance of the pivot assembly 200, the ground-contacting wheel assemblies 300 can be pre-assembled in advance as standalone assemblies and be mounted on the track system assembly 1 via the pivot assembly 200 as needed. That being the case, it is also to be understood that the ground-contacting wheel assemblies 300 can be manufactured/assembled/sold prepackaged, ready to be installed, which is very interesting from a user's perspective and from an aftermarket business perspective as well.

While embodiments of the technology have been illustrated and described in detail above, it is to be understood that the inventive concepts may be otherwise variously embodied and employed and that the appended claims are intended to be construed to include such variations. It is understood that a hybrid embodiment configured with features of the first embodiment, the second embodiment, or any variations of described embodiments are considered to be part of present technology.

All references cited in this specification, and their references, are incorporated by reference herein in their entirety where appropriate for teachings of additional or alternative details, features, and/or technical background.

The invention claimed is:

1. A pivot assembly for connecting a ground-contacting wheel assembly to a frame member of a track system assembly, the pivot assembly comprising:
    a base connected to the frame member of the track system assembly, the base defining a first interlocking member;
    a resilient body structured for being received at least partially within the base, the resilient body including a second interlocking member connectable to the first interlocking member, wherein connection of the first and the second interlocking members limits relative movement between the base and the resilient body along and about a transverse axis;
    an axle assembly configured for rotatably connecting the ground-contacting wheel assembly to the frame member of the track system assembly, the axle assembly having a peripheral surface being at least partially wrappable around by the resilient body, and the axle assembly including a third interlocking member connectable to the second interlocking member of the resilient body, wherein connection of the second and the third interlocking members limits relative movement between the resilient body and the axle assembly along and about the transverse axis; and
    wherein upon deformation of the resilient body, the axle assembly is pivotally movable relative to the frame member of the track system assembly about at least one of a longitudinal axis and a vertical axis.

2. The pivot assembly of claim 1, wherein the base is integrally formed with the frame member of the track system assembly.

3. The pivot assembly of claim 1, wherein the frame member of the track system has a cut-out defined therein sized and dimensioned for receiving the base.

4. The pivot assembly of claim 1, wherein the base defines a wrap around angle over the resilient body being greater than about 180 and smaller than about 360 degrees.

5. The pivot assembly of claim 1, wherein the base is elastically deformed to hold the resilient body within the base.

6. The pivot assembly of claim 1, wherein, when the third interlocking member is connected to the second interlocking member, a vertical spacing is defined between the first and the second interlocking members.

7. The pivot assembly of claim 1, wherein the first, second and third interlocking members have a generally hemispherical shape, the second interlocking member is received within the first interlocking member, and the third interlocking member is received within the second interlocking member.

8. The pivot assembly of claim 1, wherein the pivot assembly defines a virtual pivot point, and the longitudinal axis extends below the virtual pivot point.

9. The pivot assembly of claim 1, wherein the ground-contacting wheel assembly is a tandem assembly, and the axle assembly supports a plurality of roller wheel assemblies.

10. The pivot assembly of claim 1, wherein the resilient body wraps around the peripheral surface of the axle assembly in a wrap angle being greater than about 180 and smaller than about 360 degrees.

11. The pivot assembly of claim 1, wherein, when received at least partially within the base, the resilient body is open in a lower portion thereof.

12. The pivot assembly of claim 1, further comprising at least one clamping member connected to the base, the at least one clamping member defining a clamp recess configured to receive a bulged portion of the resilient body.

13. The pivot assembly of claim 12, wherein the at least one clamping member includes a first clamping member connected to the base and being located forward of the transverse axis, and a second clamping member connected to the base and being located rearward of the transverse axis.

14. The pivot assembly of claim 1, wherein the resilient body comprises at least one flange projecting radially away from the transverse axis, the at least one flange overlapping at least partially the base.

15. The pivot assembly of claim 1, wherein the base has an upper portion flaring outwardly from a longitudinal centre plane, and the resilient body has outer portions flaring outwardly from the longitudinal centre plane.

16. The pivot assembly of claim 1, wherein the resilient body has protrusions extending radially inwardly for sealing an interface between the resilient body and the axle assembly.

17. The pivot assembly of claim 1, wherein the resilient body has cavities defined therein for allowing local expansion of a material forming the resilient body when deformed.

18. A track system assembly comprising the pivot assembly of claim 1.

19. A method for installing a ground-contacting wheel assembly on a frame member of a track system assembly via the pivot assembly of claim 1, the method comprising the steps of:
  wrapping around the resilient body over the axle assembly for connecting the second and third interlocking members; and
  inserting the resilient body wrapped around the axle assembly into the base for connecting the first and second interlocking members.

20. The method of claim 19, further comprising the steps of:
  removing a resilient track from the track system assembly before installing the ground-contacting wheel assembly on the frame member via the pivot assembly; and
  reinstalling the resilient track on the track system assembly after installing the ground-contacting wheel assembly on the frame member via the pivot assembly.

* * * * *